United States Patent
Jones

(10) Patent No.: US 8,393,149 B2
(45) Date of Patent: Mar. 12, 2013

(54) WIND POWERED ENERGY AMPLIFICATION SYSTEM AND METHOD

(76) Inventor: Allen Mark Jones, Imperial Beach, CA (US)

( * ) Notice: Subject to any disclaimer, the term of this patent is extended or adjusted under 35 U.S.C. 154(b) by 550 days.

(21) Appl. No.: 12/505,484

(22) Filed: Jul. 18, 2009

(65) Prior Publication Data

US 2010/0013237 A1   Jan. 21, 2010

Related U.S. Application Data

(60) Provisional application No. 61/081,838, filed on Jul. 18, 2008.

(51) Int. Cl.
*F03D 11/00* (2006.01)
(52) U.S. Cl. .......................................... 60/398; 415/60
(58) Field of Classification Search ................... 60/398; 415/60

See application file for complete search history.

(56) References Cited

U.S. PATENT DOCUMENTS

| | | | | |
|---|---|---|---|---|
| 4,012,163 A * | 3/1977 | Baumgartner et al. | ..... | 415/208.3 |
| 4,208,873 A * | 6/1980 | Foglia | ............ | 60/398 |
| 6,072,245 A * | 6/2000 | Ockels | ............ | 290/55 |
| 6,692,230 B2 * | 2/2004 | Selsam | ............ | 416/132 B |
| 7,008,172 B2 * | 3/2006 | Selsam | ............ | 415/4.5 |
| 7,045,702 B2 * | 5/2006 | Kashyap | ............ | 136/244 |
| 7,321,173 B2 * | 1/2008 | Mann | ............ | 290/55 |
| 7,626,281 B2 * | 12/2009 | Kawai | ............ | 290/54 |
| 7,922,452 B2 * | 4/2011 | Dulcetti Filho | ............ | 416/117 |
| 2005/0017514 A1 * | 1/2005 | Tocher | ............ | 290/55 |
| 2007/0090653 A1 * | 4/2007 | Martelon | ............ | 290/55 |
| 2009/0224553 A1 * | 9/2009 | Williams | ............ | 290/55 |
| 2010/0181778 A1 * | 7/2010 | Herbertsson et al. | ............ | 290/55 |

\* cited by examiner

*Primary Examiner* — Joseph Waks

(57) ABSTRACT

The present invention is comprised of a wind powered energy amplification method and systems for capturing wind power and harvesting tangentially amplified energy. The harvested tangentially amplified energy is converted, processed and stored for use for generating continuous, on demand and stand by electricity to supply electricity. The present invention is further comprised of methods and systems for extracting, processing and storing water and carbon dioxide to supply water and supply carbon dioxide.

15 Claims, 24 Drawing Sheets

FIG. 11A          FIG. 11B

WIND POWERED ENERGY AMPLIFICATION SYSTEM AND METHOD

CROSS-REFERENCE TO RELATED APPLICATIONS

This application is based on U.S. Provisional Patent Application Ser. No. 61/081,838 filed Jul. 18, 2008, entitled "Wind Powered Air Compression and Storage, Compressed Air Driven Electric Generation, Atmospheric Water Vapor Extraction, Filtration, Treatment And Storage, Atmospheric Carbon Dioxide Gas Extraction And Storage Process, And Wind Power Capture Devices And Components And Assemblies To Compress Air, Store Compressed Air, Generate Electricity With Compressed Air, Extract, Filter, Treat And Store Water Vapor From Atmospheric Humidity, And To Extract And Store Atmospheric Carbon Dioxide Gas", by Allen Mark Jones.

BACKGROUND

Wind is used as the renewable energy source to generate electricity. The most common wind driven devices to generate electricity are wind turbines. High wind speeds are used to generate large amounts of electricity. There are few geographic locations with sustained high wind speeds. Wind speeds vary at unpredictable times and include periods of no wind.

BRIEF DESCRIPTION OF DRAWINGS

FIG. 11A shows a block diagram of an example of flutter vane amplification energy harvest modules at tangential speed of one embodiment of the present invention.

FIG. 11B shows a block diagram of an example of flutter vane amplification energy harvest modules at wind speed of one embodiment of the present invention.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1:
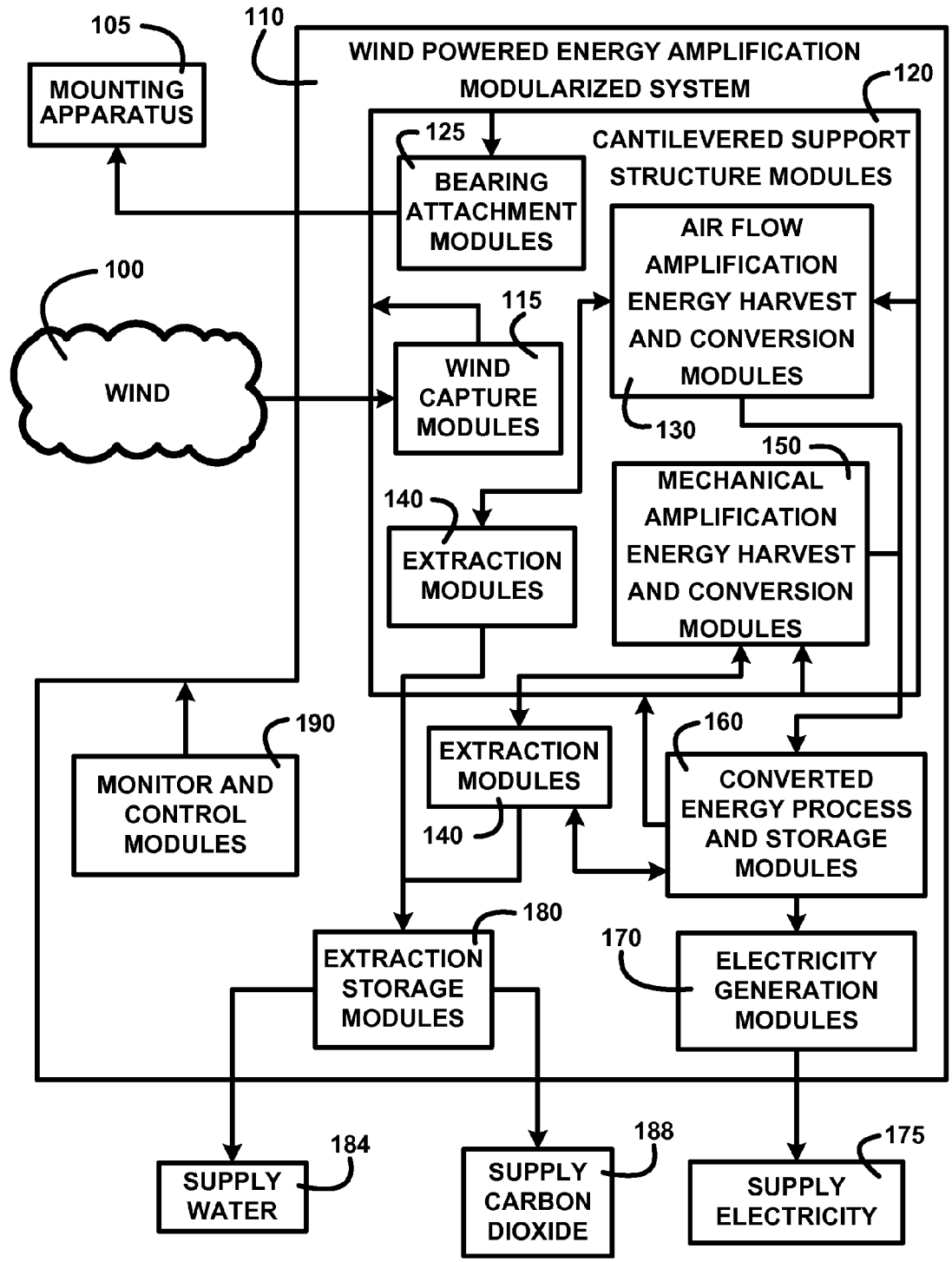
FIG. 1 shows a block diagram of an overview of a wind powered energy amplification system of one embodiment of the present invention.

General Overview:

FIG. 1 shows a block diagram of an overview of a wind powered energy amplification system of one embodiment of the present invention. FIG. 1 shows a wind powered energy amplification system which is powered by a wind 100 exerting force against a wind powered energy amplification modularized system 110.

The wind powered energy amplification modularized system 110 is used for harvesting and converting energy, extracting and processing water and carbon dioxide from air. The wind powered energy amplification modularized system 110 includes wind capture modules 115. The wind 100 exerts force against the wind capture modules 115 to rotate cantilevered support structure modules 120. The cantilevered support structure modules 120 are connected to bearing attachment modules 125 to allow rotation. The bearing attachment modules 125 are connected to a mounting apparatus 105 for example a stationary tower. The wind powered rotation rotates on an axis of rotation for example a longitudinal center of the mounting apparatus of one embodiment of the present invention.

The cantilevered support structure modules 120 can have air flow amplification energy harvest and conversion modules 130 connected to the support structure. The air flow amplification energy harvest and conversion modules 130 connected positions of the on the cantilevered support structure modules 120 allows them to rotate at a tangential speed. The tangential rotational speed is faster than the speed of the wind 100 powered speed of rotation. The air encountered by the air flow amplification energy harvest and conversion modules 130 flows at the tangential speed which amplifies the amount of energy that can be harvested and converted of one embodiment of the present invention.

Mechanical amplification energy harvest and conversion modules 150 can be connected to the cantilevered support structure modules 120 at connected positions which allow them to rotate at a tangential speed. The connection allows the transfer of the faster tangential rotational speed to the mechanical amplification energy harvest and conversion modules 150 which amplifies the amount of energy that can be harvested and converted. Converted energy process and storage modules 160 receive the converted energy of one embodiment of the present invention.

The converted energy is processed for example through extraction modules 140 prior to storage to remove carbon dioxide. The processed converted energy is place in storage modules which are included in the converted energy process and storage modules 160 for subsequent use. In one embodiment a subsequent use can be to supply converted energy to power the operation of electricity generation modules 170 to supply electricity 175. In another embodiment, converted energy from the converted energy process and storage modules 160 can be used to power the operation of forced rotation modules to control the speed of rotation and orientation of the cantilevered support structure modules 120 of one embodiment of the present invention.

Extraction modules 140 can be positioned on and near the cantilevered support structure modules 120 to for example extract water vapor from air supplied to the conversion modules of the air flow amplification energy harvest and conversion modules 130 and mechanical amplification energy harvest and conversion modules 150. The extraction modules 140 for example can extract water and carbon dioxide which can be stored in extraction storage modules 180 for subsequent use to supply water 184 and supply carbon dioxide 188 of one embodiment of the present invention.

The wind powered energy amplification modularized system 110 includes monitor and control modules 190 which are connected to the modules to for example measure wind speed and control operations. In one embodiment the monitor and control modules 190 include for example sensors to measure air flow of one embodiment of the present invention.

Figure 2:
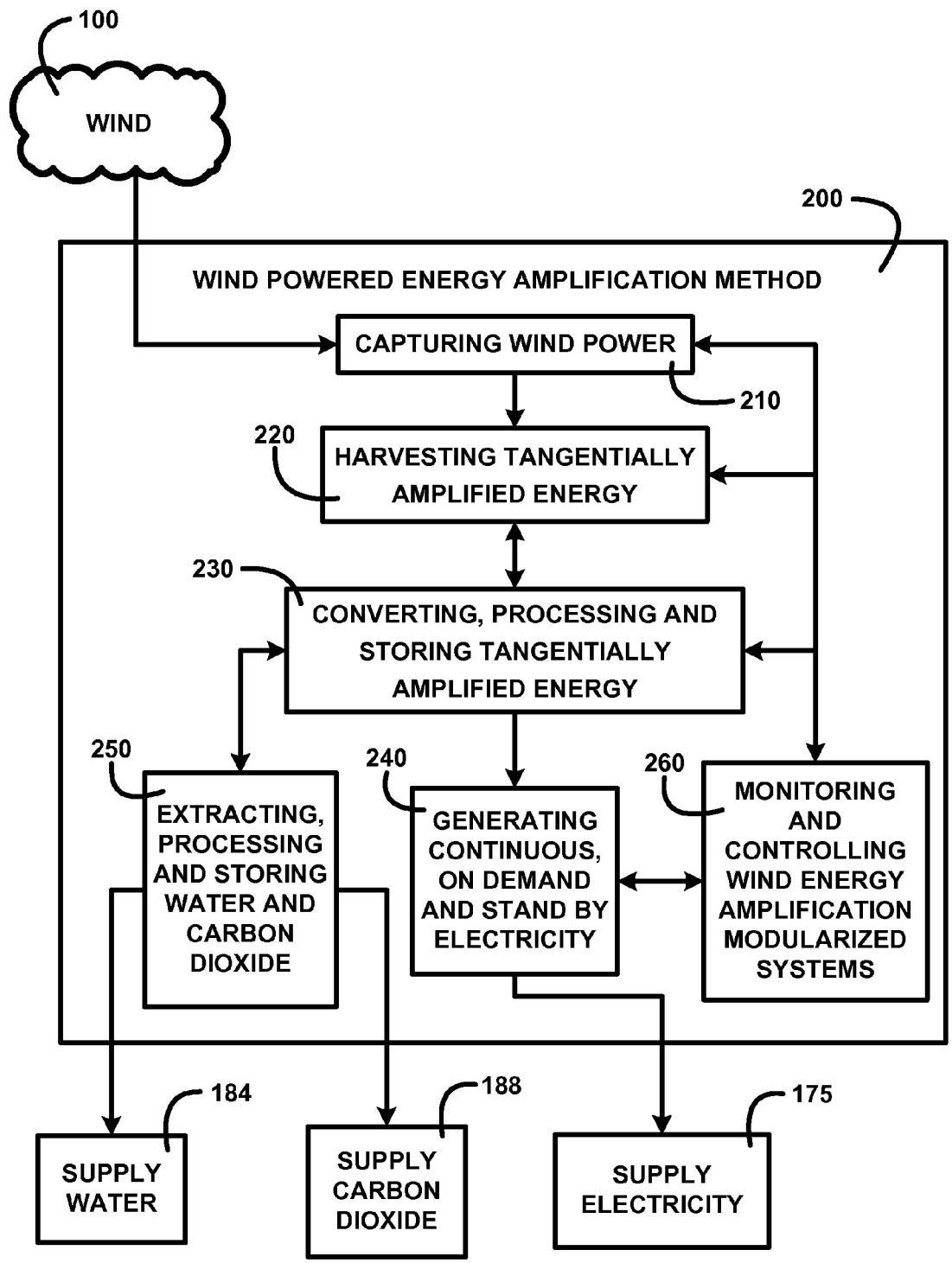
FIG. 2 shows a flow chart an overview of a wind powered energy amplification method of one embodiment of the present invention.

Detailed Operation:

FIG. 2 shows a flow chart an overview of a wind powered energy amplification method of one embodiment of the present invention. FIG. 2 shows a flow chart of a wind powered energy amplification method 200 capturing wind power 210 from the wind 100. The captured wind power allows harvesting tangentially amplified energy 220 using the wind powered energy amplification modularized system 110 of FIG. 1. The wind powered energy amplification method 200 includes converting, processing and storing tangentially amplified energy 230 that has been harvested. Stored converted tangentially amplified energy can be used for generating continuous, on demand and stand by electricity 240 to supply electricity 175. The wind powered energy amplification method 200 includes extracting, processing and storing water and carbon dioxide 250 to supply water 184 and supply carbon dioxide 188. The wind powered energy amplification method 200 includes monitoring and controlling wind energy amplification modularized systems 260 used in the wind powered energy amplification modularized system 110 of FIG. 1 of one embodiment of the present invention.

Figure 3:
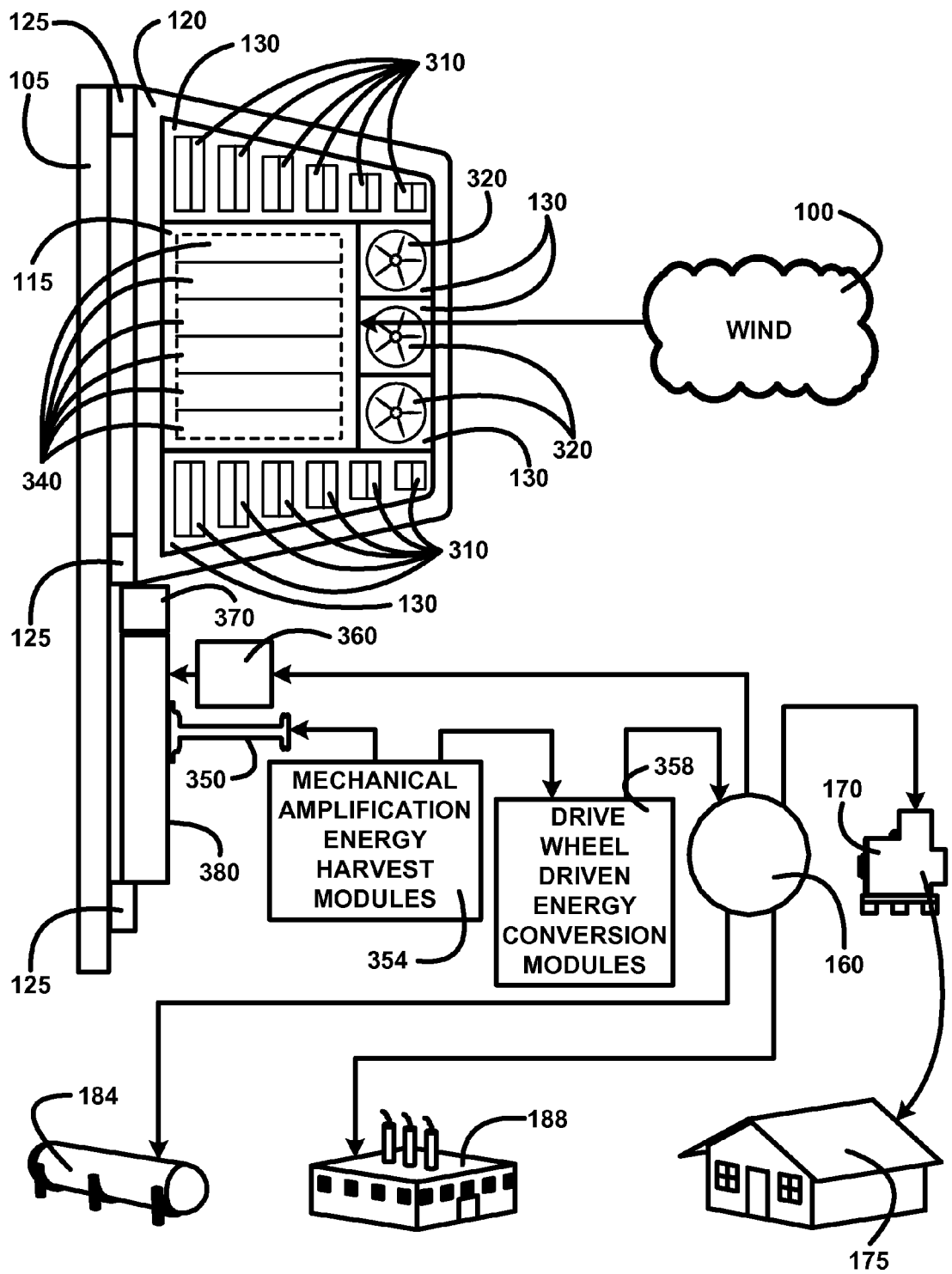
FIG. 3 shows a flow chart of a pictorial example of a wind powered energy amplification system of one embodiment of the present invention.

Wind Powered Energy Amplification System Example:

FIG. 3 shows a flow chart of a pictorial example of a wind powered energy amplification system of one embodiment of the present invention. FIG. 3 shows a pictorial example of a wind powered energy amplification system in which the cantilevered support structure modules 120 is connected to the bearing attachment modules 125 for example in two positions. The bearing attachment modules 125 are connected to the mounting apparatus 105 for example a tower. Wind capture modules 115 can be connected to the cantilevered support structure modules 120. The wind 100 exerts a force on the wind capture modules 115 for example drive panel modules 340 for example horizontally oriented air foil panels. The force exerted by the wind 100 on the wind capture modules 115 can cause rotation of the cantilevered support structure modules 120. Connected to the cantilevered support structure modules 120 can be the air flow amplification energy harvest and conversion modules 130 for example flutter vane amplification energy harvest modules 310 and propeller amplification energy harvest modules 320. The air flow amplification energy harvest and conversion modules 130 positioned on the cantilevered support structure modules 120 harvest and convert tangentially amplified energy of one embodiment of the present invention.

Connected to the cantilevered support structure modules 120 can be one or more rotation transfer connection modules 370 to attach a drive shaft systems modules 380 to transfer rotation to drive wheel modules 350 for example a flywheel. The rotation of the drive wheel modules 350 is transferred to mechanical amplification energy harvest modules 354 by connection. The mechanical amplification energy harvest modules 354 transfers rotation to the energy conversion modules 358 of one embodiment of the present invention.

The converted energy is processed to the converted energy process and storage modules 160 for example storage tanks. Stored converted energy can be used to power the electricity generation modules 170 for example an electric generator to supply electricity 175 for example a house. Stored converted energy can be used to power forced rotation modules 360 to control the rotation and orientation of the cantilevered support structure modules 120 of one embodiment of the present invention.

Water from the extraction modules 140 of FIG. 1 and extraction storage modules 180 of FIG. 1 can be used to supply water 184 to for example a water reservoir. Carbon dioxide from the extraction modules 140 of FIG. 1 and extraction storage modules 180 of FIG. 1 can be used to supply carbon dioxide 188 to for example a carbonated beverage bottling plant of one embodiment of the present invention.

Figure 4:
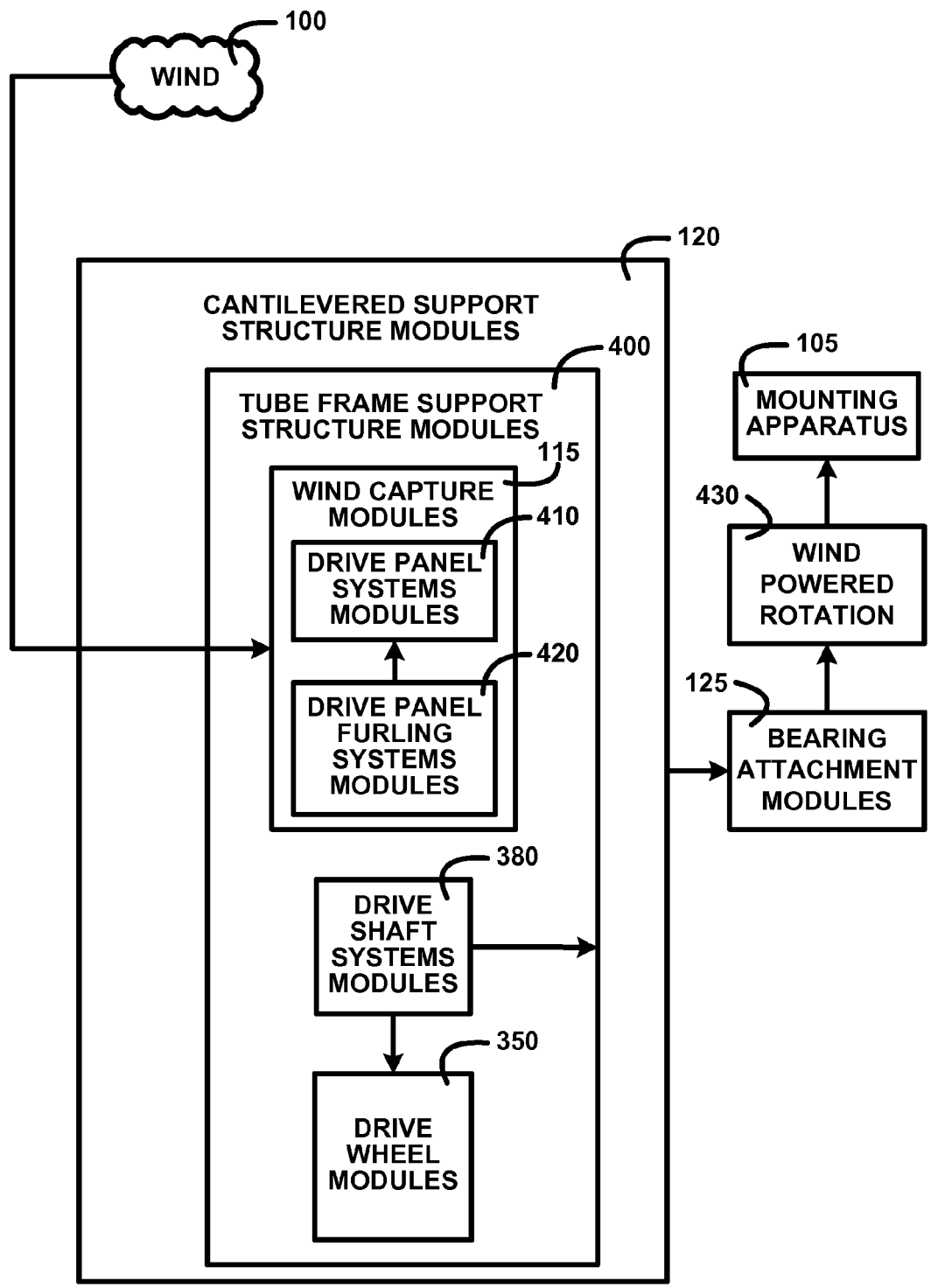
FIG. 4 shows block diagram of cantilevered support structure modules of one embodiment of the present invention.

Cantilevered Support Structure Modules:

FIG. 4 shows block diagram of cantilevered support structure modules of one embodiment of the present invention. FIG. 4 shows the wind 100 applying a force against the wind capture modules 115 connected to the cantilevered support structure modules 120. The cantilevered support structure modules 120 can be configured to be for example a tube frame support structure modules 400 to be used for example to attach modules and elements of the wind powered energy amplification modularized system 110 of FIG. 1. The cantilevered support structure modules 120 can be configured to attach to the bearing attachment modules 125 to allow wind powered rotation 430 concentrically to the mounting apparatus 105 of one embodiment of the present invention.

The wind capture modules 115 can be configured to include drive panel systems modules 410 to for example present surface area against which the wind 100 will exert a force. The drive panel systems modules 410 can be configured to include and Drive panel furling systems modules 420 to operate the drive panel systems modules 410. The cantilevered support structure modules 120 can be configured to include the attachment of the drive shaft systems modules 380 to transfer rotation to the mechanical amplification energy harvest and conversion modules 150 of FIG. 1.

The drive shaft systems modules 380 can be configured to include the attachment of drive wheel modules 350 to transfer rotation to the mechanical amplification energy harvest and conversion modules 150 of FIG. 1 of one embodiment of the present invention.

The tube frame support structure modules 400 on which other modules and elements can be attached can be configured to be fabricated of strong light weight materials for example aluminum, composites or other suitable materials able to support the weight of the components and that are not sensitive to sunlight. The elements of the tube frame support structure modules 400 can be configured for example in a tubular shape for example a cylindrical form or of a polygon structure for example a hexagon. The corners or sections in which the alignment changes angle can be configured for example can be radius curved of one embodiment of the present invention.

The cantilevered support structure modules 120 can be configured to have both vertical, horizontal and lateral elements which can be configured in straight or curved sections which can be configured for example to be constructed as a single piece or interlocking sections to provide stability and structural integrity in high stress conditions. The tubular structure will act as a raceway for the collection piping for both the compressed air produced and liquid water extractions. In one embodiment of the present invention the tube frame support structure modules 400 can be configured to adapt to a particular application, capacity and site conditions by using various different sections of varying lengths connected at various positions to provide a configuration to support varying numbers and sizes of for example air flow amplification energy harvest and conversion modules 130 of FIG. 1 and greater or lesser amounts of wind capture modules 115 surface area to increase or decrease surface area exposed to the wind 100 of one embodiment of the present invention.

Figure 5:
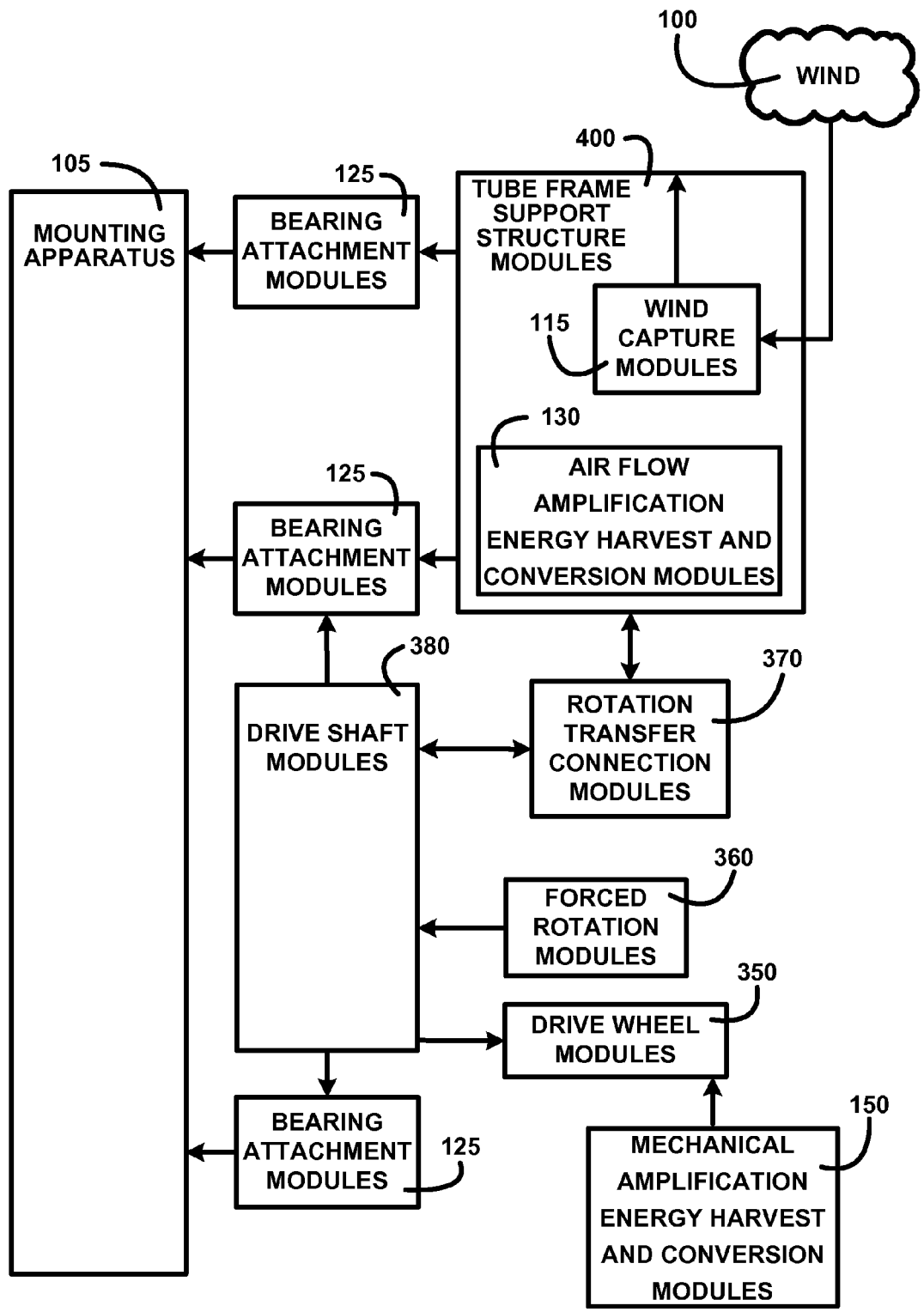
FIG. 5 shows a block diagram of tube frame support structure modules of one embodiment of the present invention.

Tube Frame Support Structure Modules:

FIG. 5 shows a block diagram of tube frame support structure modules of one embodiment of the present invention. The cantilevered support structure modules 120 of FIG. 1 can be configured to include the tube frame support structure modules 400 to be used for example to attach modules and elements that will be exposed to the wind.

The tube frame support structure modules 400 can be configured to attach to the mounting apparatus 105 by using the bearing attachment modules 125. The wind 100 exerting a force on the wind capture modules 115 will rotate the tube frame support structure modules 400 to rotate the air flow amplification energy harvest and conversion modules 130 at tangential speeds of one embodiment of the present invention.

The tube frame support structure modules 400 using the rotation transfer connection modules 370 will rotate the drive shaft modules 380 and attached drive wheel modules 350 to rotate the mechanical amplification energy harvest and conversion modules 150 at tangential speeds. The forced rotation modules 360 will rotate the drive shaft modules 380 and by using the rotation transfer connection modules 370 rotate the tube frame support structure modules 400 of one embodiment of the present invention.

Figure 6A:
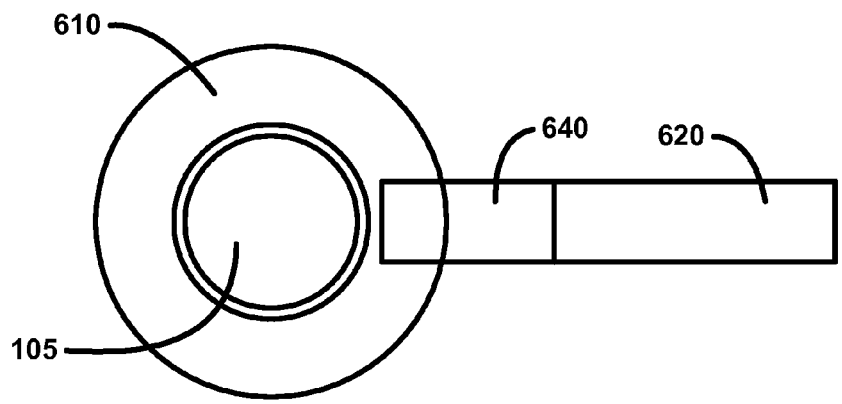
FIG. 6A shows for illustrative purposes only an example of bearing attachment modules plan view of one embodiment of the present invention.
Figure 6B:
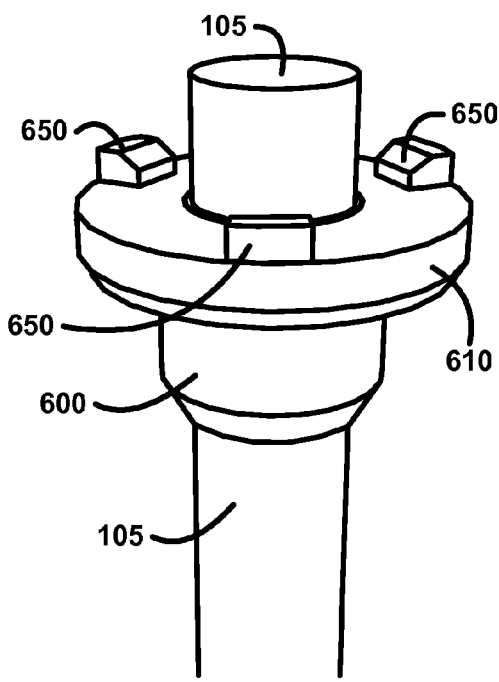
FIG. 6B shows for illustrative purposes only an example of bearing attachment modules prospective view of one embodiment of the present invention.
Figure 6C:
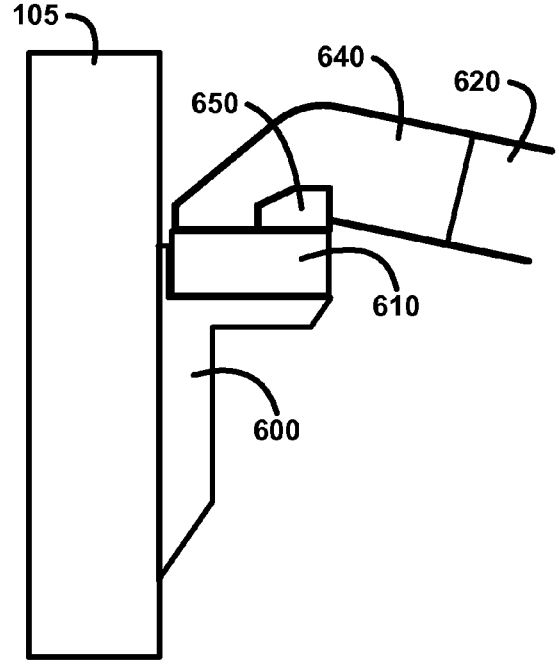
FIG. 6C shows for illustrative purposes only an example of bearing attachment modules block diagram of one embodiment of the present invention.

Bearing Attachment Modules:

In one embodiment of the present invention FIG. 6A, FIG. 6B and FIG. 6C illustrate in different views examples of bearing attachment modules 125 of FIG. 1. The bearing attachment modules 125 of FIG. 1 can allow the cantilevered support structure modules 120 of FIG. 1 to be attached to the mounting apparatus 105, provides low friction rotation and strong mechanical connections.

FIG. 6A shows for illustrative purposes only an example of bearing attachment modules plan view of one embodiment of the present invention. FIG. 6A shows in a plan view the radial attachment of for example a tube frame 620 element of the cantilevered support structure modules 120 of FIG. 1 using a tube frame mounting bracket 640 to attach to a bearing 610 mounted on the mounting apparatus 105. One or more of the cantilevered support structure modules 120 of FIG. 1 can be configured to attach in radial position on the mounting apparatus 105 of one embodiment of the present invention.

FIG. 6B shows for illustrative purposes only an example of bearing attachment modules prospective view of one embodiment of the present invention. FIG. 6B shows in a prospective view a bearing platform 600 configured to attach to the mounting apparatus 105. The bearing 610 is connected to the bearing platform 600. One or more mounting block 650 elements can be attached to the bearing 610. In another embodiment of the present invention the mounting block 650 elements can be connected directly to the bearing platform 600 to create a static configuration wherein there will be no rotation for example to attach cantilevered support structure modules 120 of FIG. 1 to support for example non rotating equipment for example storage tanks above ground of one embodiment of the present invention.

FIG. 6C shows for illustrative purposes only an example of bearing attachment modules block diagram of one embodiment of the present invention. FIG. 6C shows a block diagram of the bearing attachment modules 125 of FIG. 1 configured for example in a rotating configuration wherein the tube frame 620 is attached to the tube frame mounting bracket 640 which is connected to the bearing 610 attached to the bearing platform 600. The tube frame mounting bracket 640 is configured to be installed on top of the matching form of the mounting block 650 to provide a strong mechanical connection of one embodiment of the present invention.

In one embodiment of the present invention the tube frame mounting bracket 640 and the mounting block 650 are configured to be connected by a mounting block lock to prevent separation and lateral displacement. The bearing attachment modules 125 of FIG. 1 can be installed at various points on the mounting apparatus 105. The bearing attachment modules 125 of FIG. 1 enable the cantilevered support structure modules 120 of FIG. 1 to rotate concentrically around the mounting apparatus 105 of one embodiment of the present invention.

Figure 7:
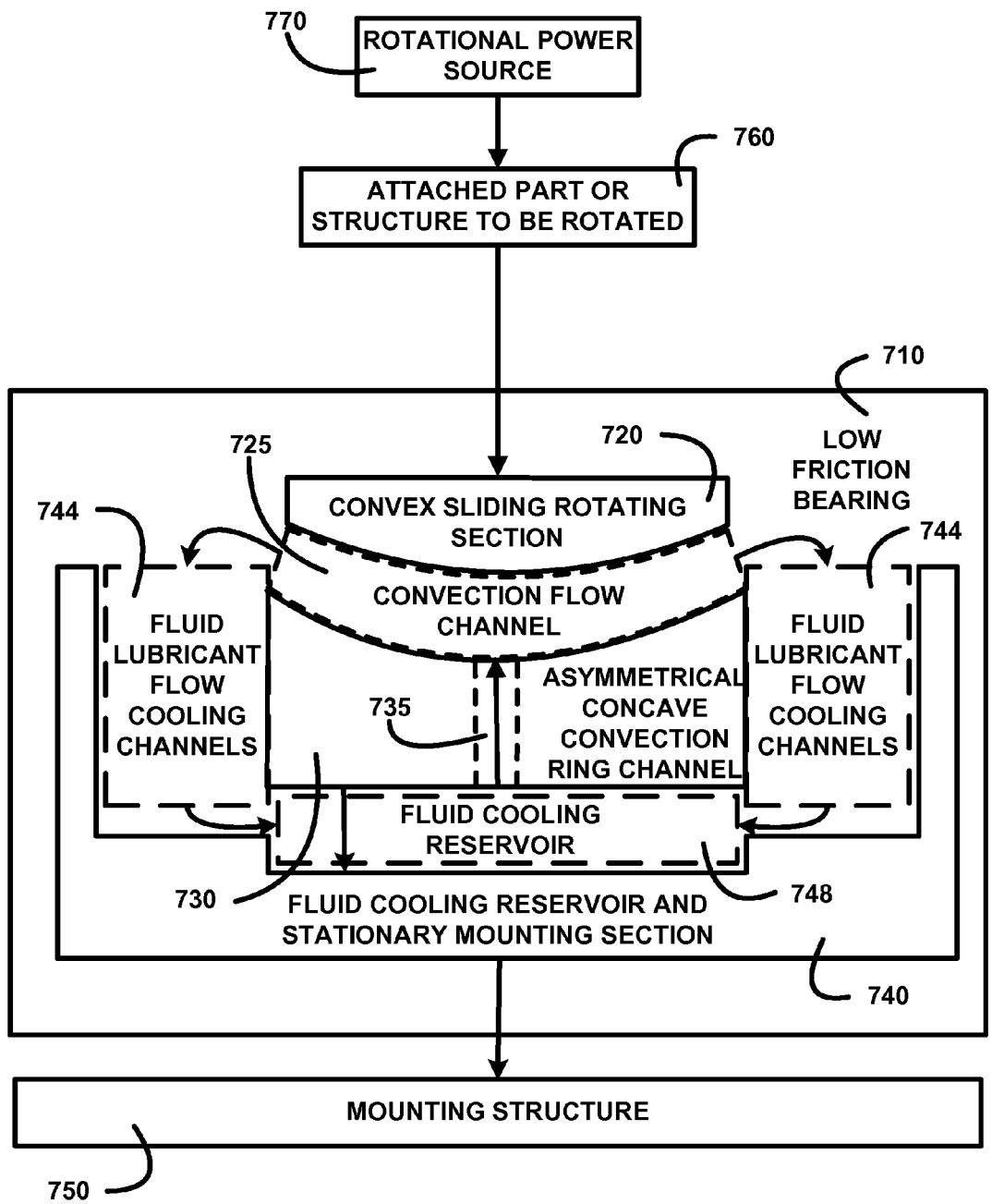
FIG. 7 shows a block diagram of an overview of a convection cooling bearing system of one embodiment of the present invention.

Convection Cooling Bearing System:

FIG. 7 shows a block diagram of an overview of a convection cooling bearing system of one embodiment of the present invention. FIG. 7 shows a convection cooled bearing system for a low friction bearing 710 with convection circulation of fluid lubricant through cooling flow channels and reservoir. In one embodiment of the present invention the cooling of the fluid lubricant can reduce heat caused degradation of the fluid lubricant thereby extending its use and reducing the frequency of fluid lubricant replacement.

The low friction bearing 710 includes a convex sliding rotating section 720 configured to slide a convex surface on a fluid lubricant as it rotates to reduce friction. The convex sliding rotating section 720 provides a point of attachment for parts or structures to be rotated and to mate with an asymmetrical concave surface to form a convection flow channel 725 for the fluid lubricant. An asymmetrical concave convection ring channel 730 is configured to mate with the convex sliding rotating section 720 to form the convection flow channel 725 for the fluid lubricant of one embodiment of the present invention.

The asymmetrical concave convection ring channel 730 is configured to connect with offsetting attachments to a fluid cooling reservoir and stationary mounting section 740 to form multiple fluid lubricant flow cooling channels 744 for circulation of the fluid lubricant and to provide seep holes through which cooled fluid lubricant is drawn from the fluid cooling reservoir 748 into the convection flow channel 725 of one embodiment of the present invention.

The non uniform convection flow channel 725 is formed by the non uniform space of a permanent separation of the mated opposing surfaces of the convex sliding rotating section 720 and the asymmetrical concave convection ring channel 730 wherein the curvature arc of the convex and concave surfaces are configured by offset radius centers to allow uneven heating of the fluid lubricant by friction to create circulation of the fluid lubricant by convection of one embodiment of the present invention.

The fluid cooling reservoir and stationary mounting section 740 configured to attach the low friction bearing 710 to an object. The fluid cooling reservoir and stationary mounting section 740 configured to receive connection of the asymmetrical concave convection ring channel 730 to form the multiple fluid lubricant flow cooling channels 744 for circulation of the fluid lubricant. The fluid cooling reservoir and stationary mounting section 740 configured to act as a heat sink temperature transfer structure to absorb heat from the circulating fluid lubricant to cool the fluid lubricant. The fluid cooling reservoir and stationary mounting section 740 configured to accumulate the circulating fluid lubricant in the fluid cooling reservoir 748 to further cool the fluid lubricant and supply cooled fluid lubricant to the convection flow channel 725 by being drawn by the convection flow through the seep holes 735 of the asymmetrical concave convection ring channel 730 of one embodiment of the present invention.

In one embodiment the fluid lubricant used in the low friction bearing 710 can be for example various lubricants including lubricants which when heated by ambient or operating temperatures become fluidic.

The low friction bearing 710 can be configured for example wherein the convex sliding rotating section 720, the a asymmetrical concave convection ring channel 730 and the fluid cooling reservoir and stationary mounting section 740 can be configured to form rings wherein the geometric chords of the convex and concave surfaces are perpendicular to the axis of rotation of one embodiment of the present invention.

The low friction bearing 710 can be configured for example wherein the convex sliding rotating section 720, the a asymmetrical concave convection ring channel 730 and the fluid cooling reservoir and stationary mounting section 740 can be configured to form rings wherein the geometric chords of the convex and concave surfaces are parallel to the axis of rotation of one embodiment of the present invention.

The low friction bearing 710 can be configured for example wherein the convex sliding rotating section 720, the a asymmetrical concave convection ring channel 730 and the fluid cooling reservoir and stationary mounting section 740 can be configured to form rings wherein the geometric chords of the convex and concave surfaces are parallel to the axis of rotation wherein the convex sliding rotating section is configured to the inside of the formed ring of one embodiment of the present invention.

The low friction bearing 710 can be configured for example wherein the convex sliding rotating section 720, the a asymmetrical concave convection ring channel 730 and the fluid cooling reservoir and stationary mounting section 740 can be configured to form rings wherein the geometric chords of the convex and concave surfaces are parallel to the axis of rotation wherein the convex sliding rotating section is configured to the outside of the formed ring of one embodiment of the present invention.

The low friction bearing 710 can be configured for example wherein the convex sliding rotating section 720, the a asymmetrical concave convection ring channel 730 and the fluid cooling reservoir and stationary mounting section 740 can be configured to form lineal or curved sections wherein the geometric chords of the convex and concave surfaces are perpendicular to the lineal or curved direction of movement of one embodiment of the present invention.

Figure 8A:
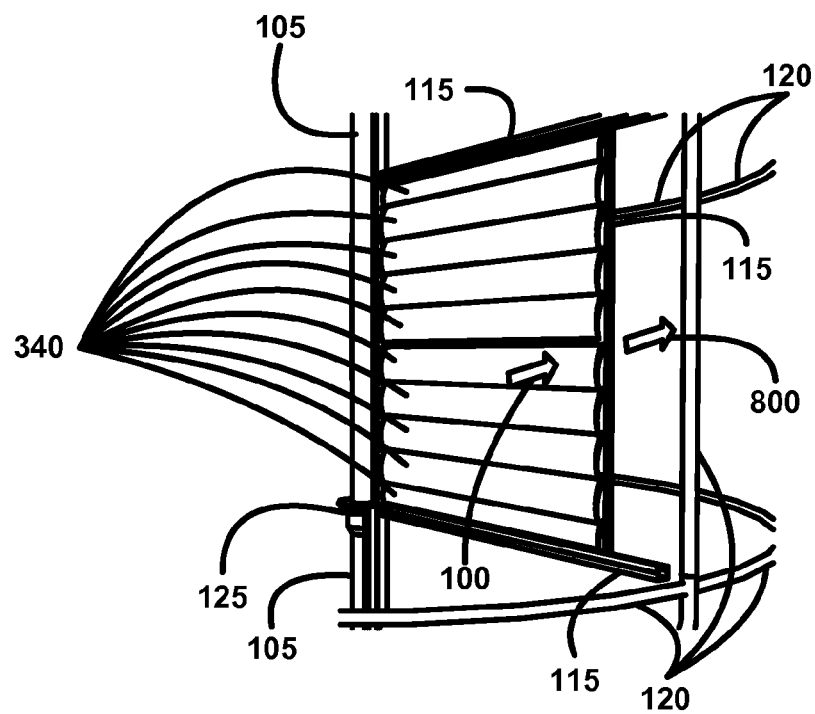
FIG. 8A shows for illustrative purposes only a prospective view of an example of wind capture modules in a closed position of one embodiment of the present invention.

Wind Capture Modules:

FIG. 8A shows for illustrative purposes only a prospective view of an example of wind capture modules in a closed position of one embodiment of the present invention. The wind capture modules 115 of FIG. 1 can be configured to use for example the drive panel modules 340 to capture the power of the wind 100. The drive panel modules 340 can be configured with for example air foil panel sections configured as one panel and configured in sectionalized air foil panels which when installed span the wind capture area width of the drive panel modules 340. The drive panel modules 340 can be configured with for example furling system modules to rotate drive panels in various degrees of rotation to control the amount of drive panel surface area exposed to the wind to control the rotational speed of the cantilevered support structure modules 120 for example panels from a vertical to a horizontal position and rotate panels from a horizontal position to a vertical position of one embodiment of the present invention.

The furling system modules can be configured to operate by for example furling actuators and linking connections to each panel section. Furling actuators and linking connections to each panel section can be configured to be operated by for example air motor driven systems using converted energy for example compressed air from air flow amplification energy harvest and conversion modules 130 connected to the cantilevered support structure modules 120 of one embodiment of the present invention.

The drive panel modules 340 can be configured to rotate from a horizontal opened position to a vertical closed position which presents a closed perpendicular surface area against which the wind 100 can exert a force. The drive panel modules 340 can be configured to for example to use an automated control system that rotates the air foil panel sections to a closed position as the rotation enters a downwind direction of rotation 800. The wind 100 will exert a greater force to a closed air foil panel having a larger wind capture surface area than will be exerted to an open air foil panel having a smaller edge wind capture surface area. The greater force will cause the cantilevered support structure modules 120 to rotate by connection to the bearing attachment modules 125 mounted on the mounting apparatus 105 of one embodiment of the present invention.

Figure 8B:
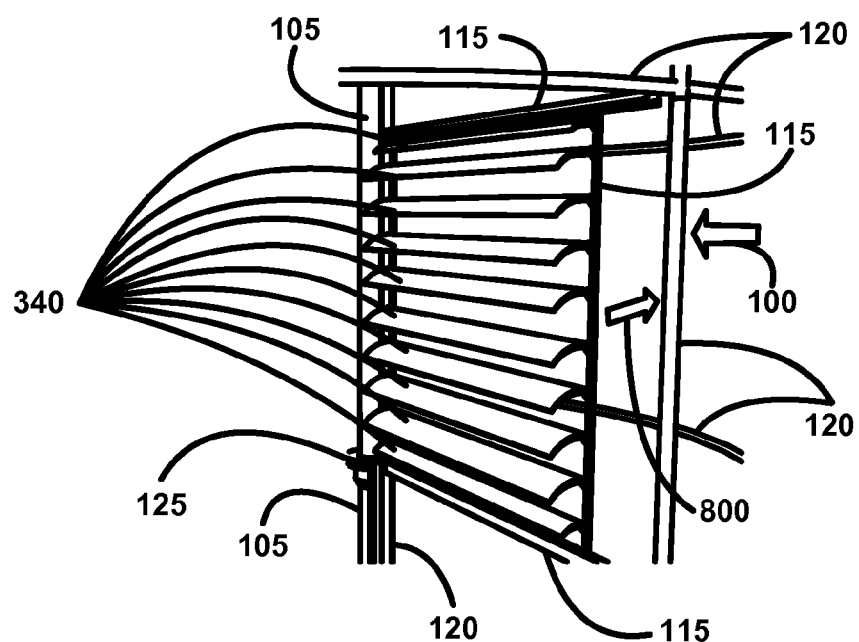
FIG. 8B shows for illustrative purposes only a prospective view of an example of wind capture modules in an opened position of one embodiment of the present invention.

FIG. 8B shows for illustrative purposes only a prospective view of an example of wind capture modules in an opened position of one embodiment of the present invention. The drive panel modules 340 can be configured to rotate from a vertical closed position to a horizontal opened position which presents an opened parallel edge area against which the wind 100 can exert a force. The drive panel modules 340 can be configured to for example to use an automated control system that rotates the air foil panel sections to an opened position as the rotation enters an upwind direction of rotation 800. The wind 100 will exert a lesser force to an opened air foil panel having a smaller edge wind capture surface area than will be exerted to a closed air foil panel having a smaller edge wind capture surface area. The lesser force will cause drag which will reduce the rotation of the cantilevered support structure modules 120 of one embodiment of the present invention.

The total of the wind capture area presented in a closed position is greater as compared to the total of the edge wind capture area presented in an opened position. The force exerted by the wind 100 is captured by the amount of wind capture area presented to the wind 100. The greater force exerted in the closed position will force the wind powered rotation of the cantilevered support structure modules 120 connected to the bearing attachment modules 125 mounted on the mounting apparatus 105 of one embodiment of the present invention.

Figure 9A:
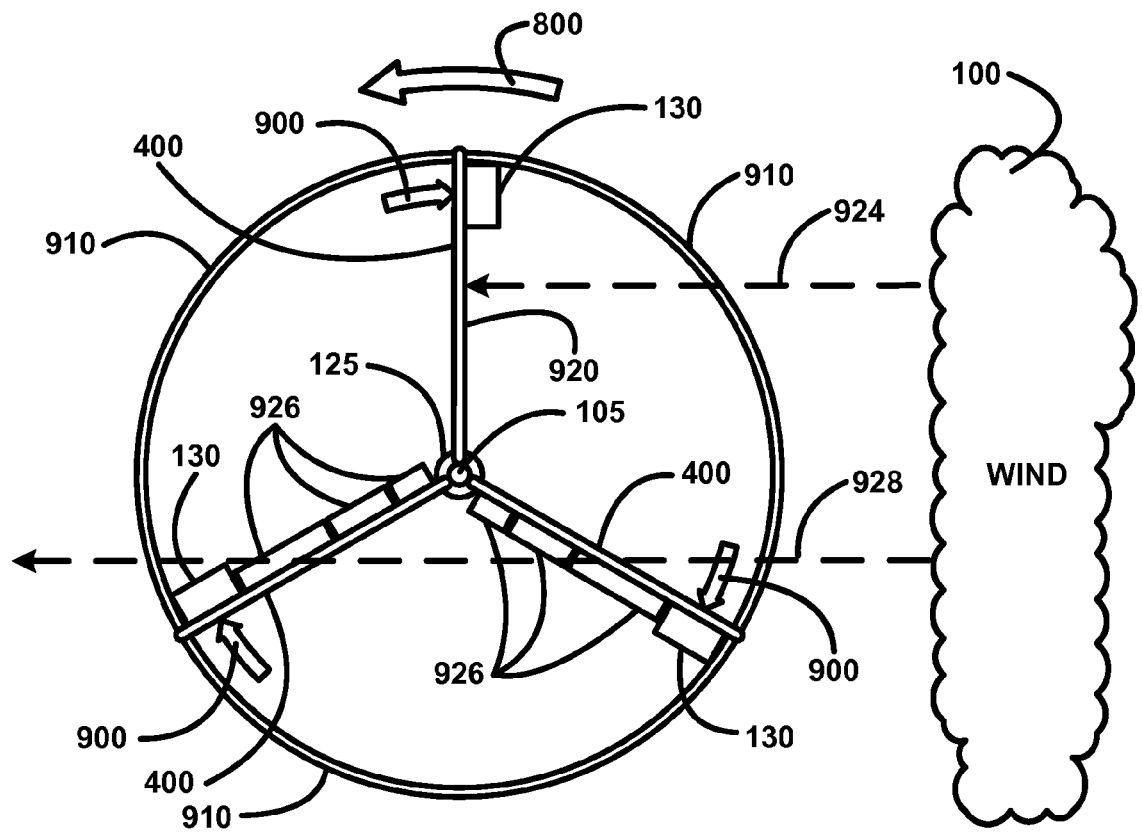
FIG. 9A shows for illustrative purposes only an example of wind powered rotation of the cantilevered support structure modules of one embodiment of the present invention.

Wind Powered Rotation:

FIG. 9A shows for illustrative purposes only an example of wind powered rotation of the cantilevered support structure modules of one embodiment of the present invention. The cantilevered support structure modules 120 of FIG. 1 can be configured to use for example tube frame support structure modules 400 and tube frame lateral support elements 910 for example to form the above ground support structure to be exposed to the force of the wind 100. The tube frame support structure modules 400 can be configured to have the air flow amplification energy harvest and conversion modules 130 attached at positions on the tube frame support structure modules 400 at a radial distance from the axis of rotation at the center of the mounting apparatus 105 and bearing attachment modules 125 of one embodiment of the present invention.

The wind capture modules 115 of FIG. 1 can be configured to use for example the drive panel modules 340 to capture the power of the wind 100. The wind 100 exerts a greater force 924 against wind capture modules in a closed position 920.

The wind 100 exerts a lesser force 928 against wind capture modules in an opened position 926. The difference in the force exerted on the wind capture modules 115 of FIG. 1 in the closed and opened positions creates the wind powered rotation of the cantilevered support structure modules 120 of FIG. 1 to rotate in a direction of rotation 800 of one embodiment of the present invention.

The air flow amplification energy harvest and conversion modules 130 attached to the tube frame support structure modules 400 will by the position of attachment rotate at a tangential speed greater than the wind speed.

The air flow amplification energy harvest and conversion modules 130 will be exposed to rotational encountered air flow 900 through the harvesting elements of the air flow amplification energy harvest and conversion modules 130. The rotational encountered air flow 900 will be moving opposite to the direction of rotation 800. The wind powered rotation will create tangentially amplified air flow through the air flow amplification energy harvest and conversion modules 130 of one embodiment of the present invention.

Figure 9B:
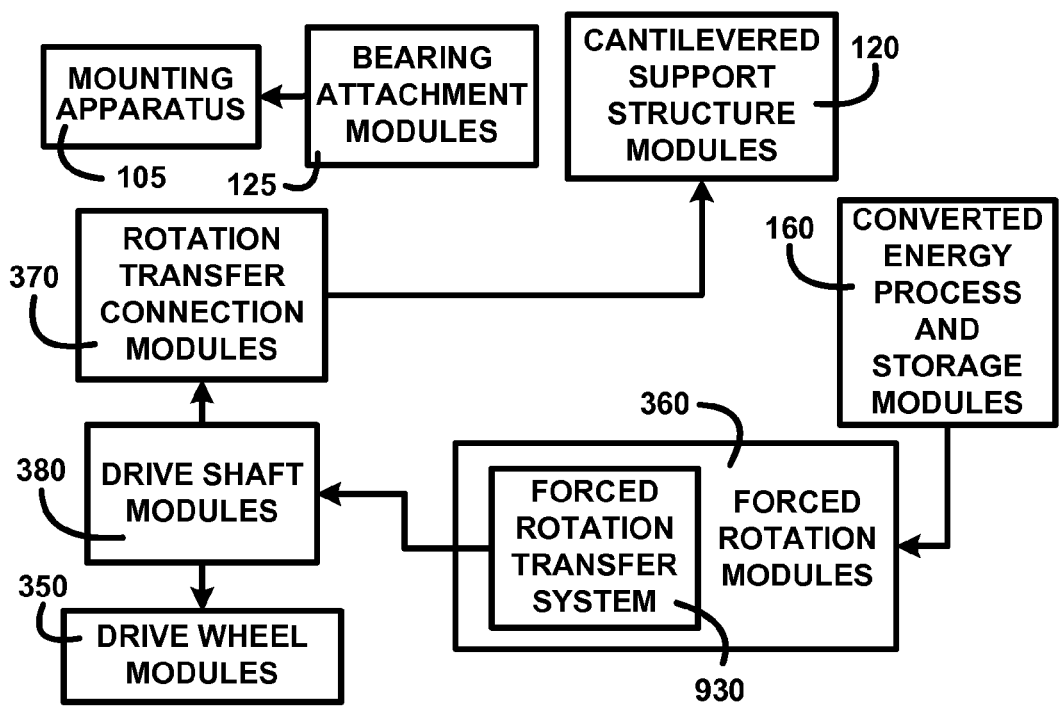
FIG. 9B shows for a block diagram of an example of forced rotation of the cantilevered support structure modules of one embodiment of the present invention.

Forced Rotation:

FIG. 9B shows for a block diagram of an example of forced rotation of the cantilevered support structure modules of one embodiment of the present invention. FIG. 9B shows a supply of converted energy from the converted energy process and storage modules 160 to the forced rotation modules 360 configured to use the converted energy in a forced rotation transfer system 930. The forced rotation transfer system 930 can be configured for example to use the converted energy in the form of compressed air to power an air motor to rotate a contact wheel which by contact with the drive shaft modules 380 will transfer rotation to the drive shaft modules 380. The drive wheel modules 350 will rotate by attachment to the drive shaft modules 380 when the forced rotation is applied of one embodiment of the present invention.

The drive wheel modules 350 are attached to the rotation transfer connection modules 370. The rotation transfer connection modules 370 are attached to the cantilevered support structure modules 120 which rotate by connection to the bearing attachment modules 125 attached to the mounting apparatus 105. The forced rotation of the drive wheel modules 350 will by connection transfer the forced rotation to the cantilevered support structure modules 120. The forced rotation of the cantilevered support structure modules 120 will produce tangentially increased rotation which will allow the air flow amplification energy harvest and conversion modules 130 and mechanical amplification energy harvest and conversion modules 150 to harvest and convert energy during period when forced rotation is applied for example a restart of rotation after a period of maintenance of one embodiment of the present invention.

Figure 10:
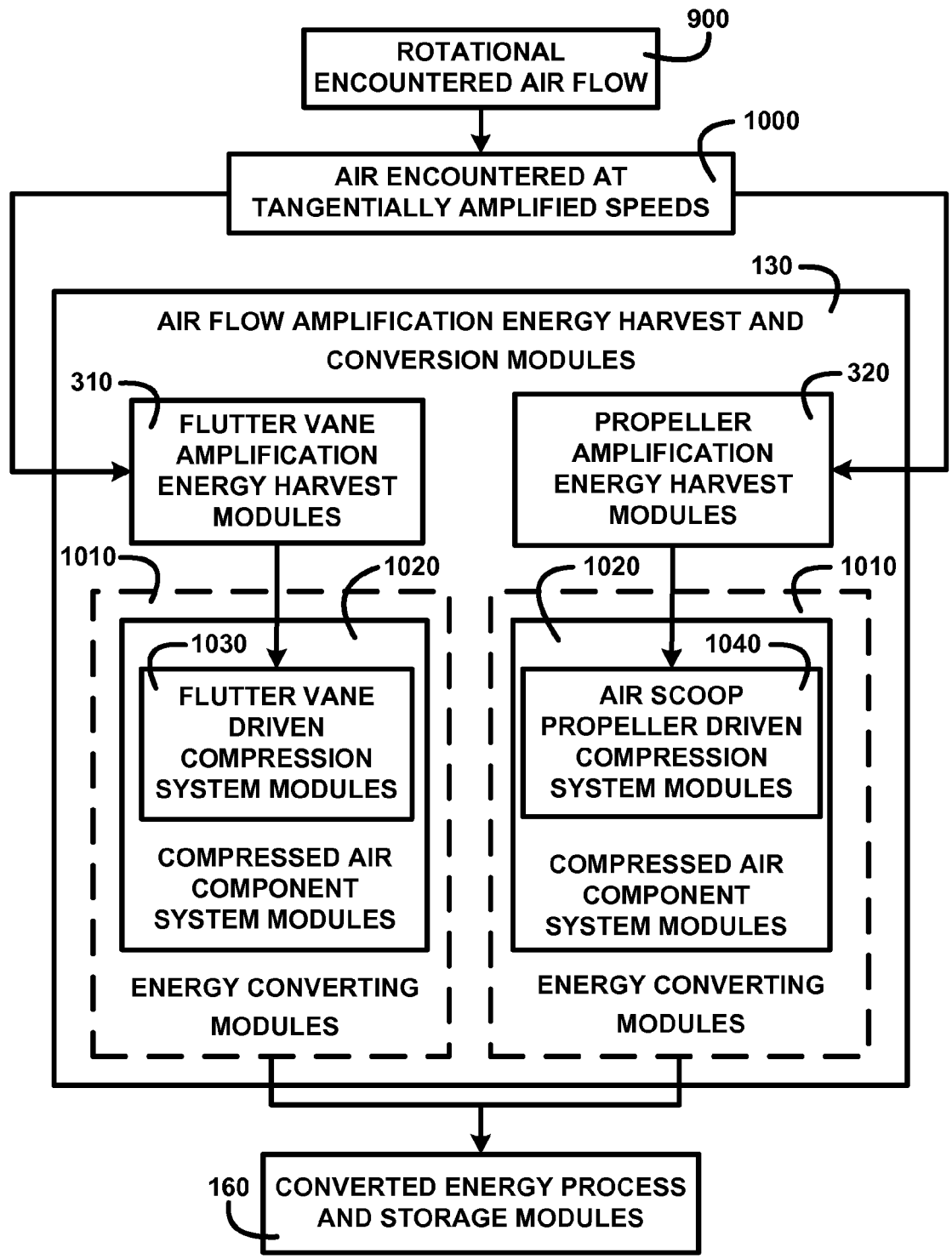
FIG. 10 shows a block diagram of an overview of air flow amplification energy harvest and conversion modules of one embodiment of the present invention.

Air Flow Amplification Energy Harvest and Conversion Modules:

FIG. 10 shows a block diagram of an overview of air flow amplification energy harvest and conversion modules of one embodiment of the present invention. The rotational encountered air flow 900 can by position on the rotating cantilevered support structure modules 120 of FIG. 1 become air encountered at tangentially amplified speeds 1000. The air encountered at tangentially amplified speeds 1000 can be used to power the air flow amplification energy harvest and conversion modules 130 of one embodiment of the present invention.

The air flow amplification energy harvest and conversion modules 130 can be configured to include the flutter vane amplification energy harvest modules 310 to harvest the energy of the air encountered at tangentially amplified speeds 1000.

The flutter vane amplification energy harvest modules 310 can be configured to include energy converting modules 1010 for example compressed air component system modules 1020 to convert the harvested energy. The compressed air component system modules 1020 can be configured to include flutter vane driven compression system modules 1030 to be operated by the transfer of rotation from the flutter vane amplification energy harvest modules 310 to the flutter vane driven compression system modules 1030. The flutter vane driven compression system modules 1030 can be configured to convey the converted energy to the converted energy process and storage modules 160 of one embodiment of the present invention.

The air flow amplification energy harvest and conversion modules 130 can be configured to include the propeller amplification energy harvest modules 320 to harvest the energy of the air encountered at tangentially amplified speeds 1000. The propeller amplification energy harvest modules 320 can be configured to include energy converting modules 1010 for example compressed air component system modules 1020 to convert the harvested energy. The compressed air component system modules 1020 can be configured to include air scoop propeller driven compression system modules 1040 to be operated by the transfer of rotation from the propeller amplification energy harvest modules 320 to the air scoop propeller driven compression system modules 1040. The air scoop propeller driven compression system modules 1040 can be configured to convey the converted energy to the converted energy process and storage modules 160 of one embodiment of the present invention.

Flutter Vane Amplification Energy Harvest Modules:

FIG. 11A shows a block diagram of an example of flutter vane amplification energy harvest modules at tangential speed of one embodiment of the present invention. The air flow amplification energy harvest and conversion modules 130 of FIG. 1 can be configured to include flutter vane amplification energy harvest modules 310 to harvest and convert energy from the wind 100 of FIG. 1 and air encountered at tangentially amplified speeds 1000. The flutter vane amplification energy harvest modules 310 can be configured to include for example one or more flutter vane blade 1100 that can be configured for example a curved elongated panel to harvest the energy of the air encountered at tangentially amplified speeds 1000 of one embodiment of the present invention.

A Venturi wing 1120 can be configured to form a Venturi constriction with the outer edge of the flutter vane blade 1100. The flutter vane blade 1100 can be configured to include the Venturi wing 1120 at the outer edge of the elongated panel to allow the air moving to the Venturi wing 1120 and off the outer edge of the elongated panel can accelerate the speed of the moving air by the Venturi effect to add force to the rotation of the flutter vane amplification energy harvest modules 310. The flutter vane blade 1100 can be configured to be attached to a flutter vane axle hub 1110 to allow the flutter vane blade 1100 to rotate concentrically with the longitudinal axis of the flutter vane axle hub 1110 of one embodiment of the present invention.

FIG. 11B shows a block diagram of an example of flutter vane amplification energy harvest modules at wind speed of one embodiment of the present invention. The flutter vane blade 1100 can be configured to rotate concentrically with the longitudinal axis of the flutter vane axle hub 1110 by the force of the wind 100. The wind that moves to the Venturi wing 1120 and off the outer edge of the elongated panel can accelerate the speed of the moving air by the Venturi effect to add force to the rotation of the flutter vane amplification energy harvest modules 310 of one embodiment of the present invention.

Figure 11C:
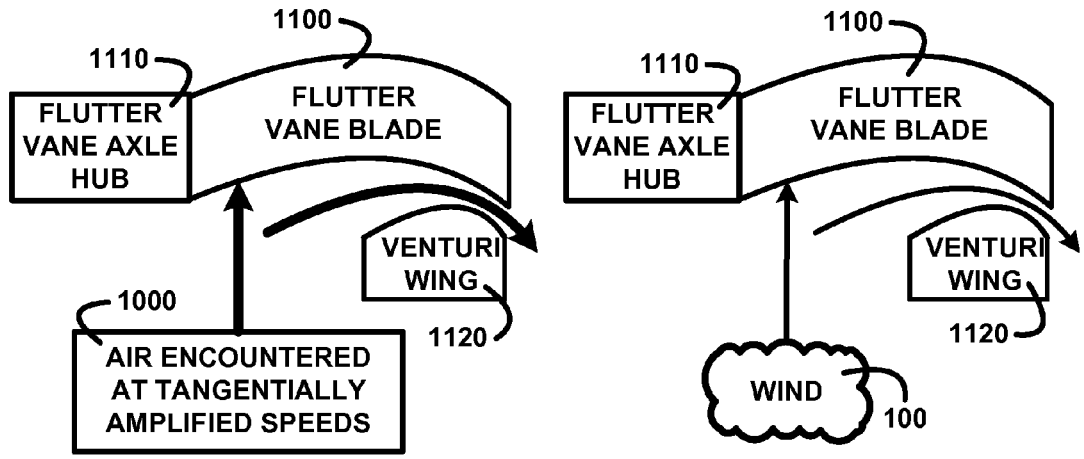
FIG. 11C shows a block diagram of an example of flutter vane amplification energy harvest modules installation of one embodiment of the present invention.
Figure 11C:
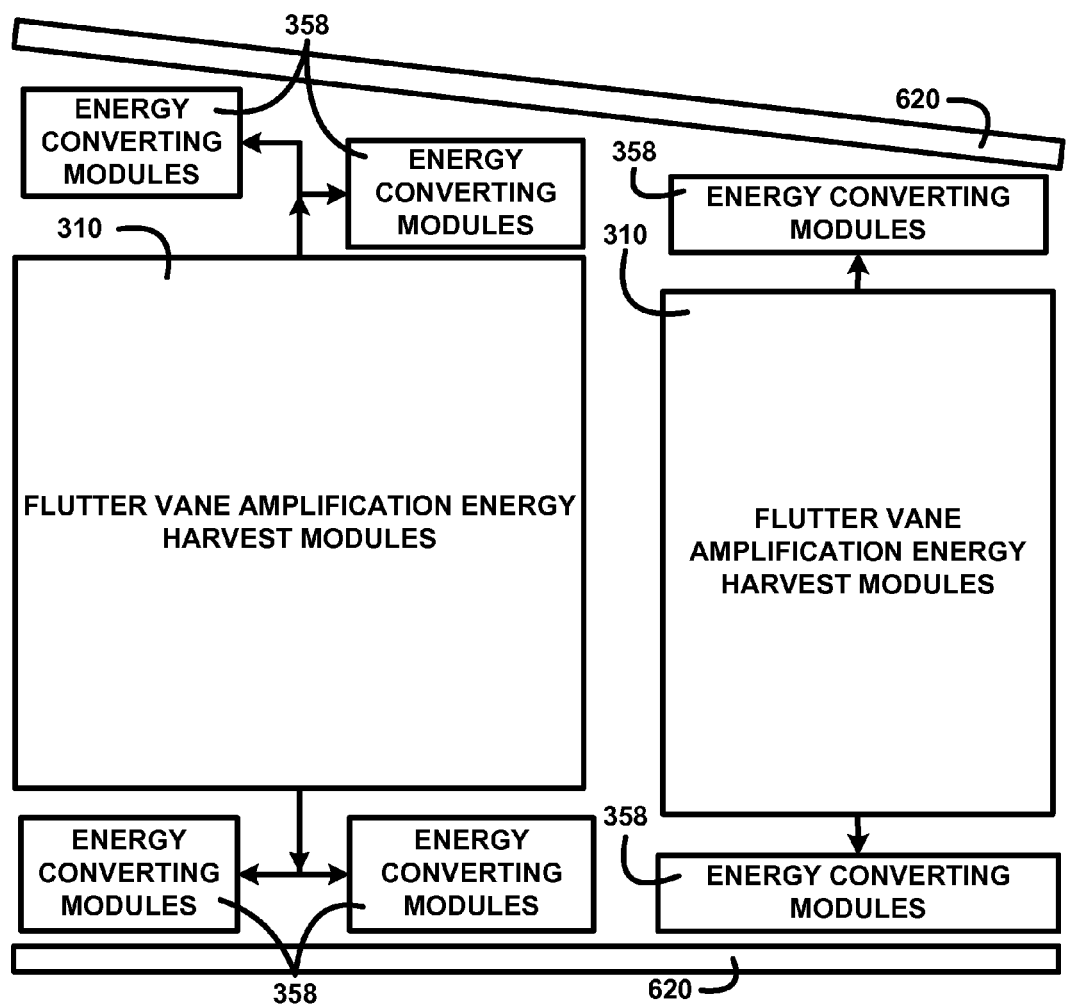

FIG. 11C shows a block diagram of an example of flutter vane amplification energy harvest modules installation of one embodiment of the present invention. In one embodiment of the present invention the flutter vane amplification energy harvest modules 310 can be configured to be connected to the tube frame 620 at various positions that will allow the flutter vane amplification energy harvest modules 310 to be rotated at tangentially amplified speeds. The flutter vane amplification energy harvest modules 310 can be configured to attach the energy converting modules 1010 to convert the energy harvested by the flutter vane amplification energy harvest modules 310 attached to the tube frame 620. The flutter vane amplification energy harvest modules 310 can be configured to attach to angled sections of the tube frame 620 to allow adaptation to different configurations of one embodiment of the present invention.

Figure 12:
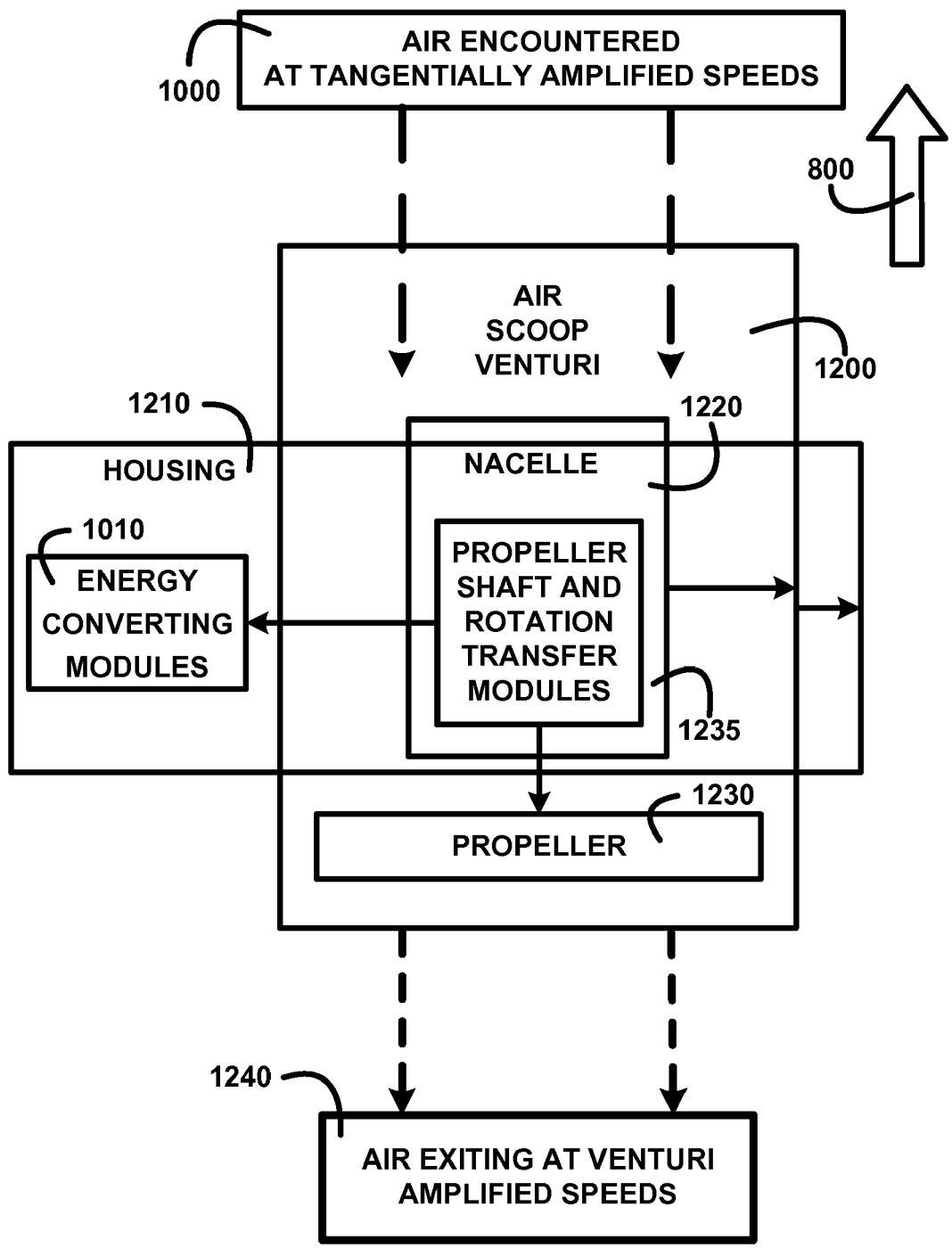
FIG. 12 shows a block diagram of an example of propeller amplification energy harvest modules of one embodiment of the present invention.

Propeller Amplification Energy Harvest Modules:

FIG. 12 shows a block diagram of an example of propeller amplification energy harvest modules of one embodiment of the present invention. FIG. 12 shows an example of propeller amplification energy harvest modules which can be configured to include a housing 1210 that can be configured to include attached energy converting modules 1010. The energy converting modules 1010 will convert the energy harvested by a propeller 1230. The propeller 1230 can be configured to attach to a propeller shaft and rotation transfer modules 1235 to allow the propeller 1230 to rotate. The rotation transfer modules 1235 can be configured to attach to a nacelle 1220 to provide a stable structure to hold the propeller 1230 in position. The nacelle 1220 can be configured to attach to an air scoop Venturi 1200 to allow air flow passing through the air scoop Venturi 1200 to be accelerated by the Venturi effect of one embodiment of the present invention.

The air scoop Venturi 1200 can be configured to attach to the housing 1210 to hold the air scoop Venturi in a position concentric to the propeller shaft and rotation transfer modules 1235. The air scoop Venturi 1200 can be configured to allow the air encountered at tangentially amplified speeds 1000 to enter the air scoop Venturi 1200 wide opening from a direction opposite to the direction of rotation 800. The air scoop Venturi 1200 can be configured to include a constricted diameter less than the wide opening to allow the Venturi effect to accelerate the air encountered at tangentially amplified speeds 1000 further. The propeller 1230 can be configured to harvest the energy of the air flow moving at speeds amplified by the tangential speed and Venturi effect by rotating. The propeller shaft and rotation transfer modules 1235 can be configured to transfer rotation from the propeller 1230 to the energy converting modules 1010 to allow the energy converting modules 1010 to convert the energy harvested by the propeller 1230 of one embodiment of the present invention.

Figure 13:
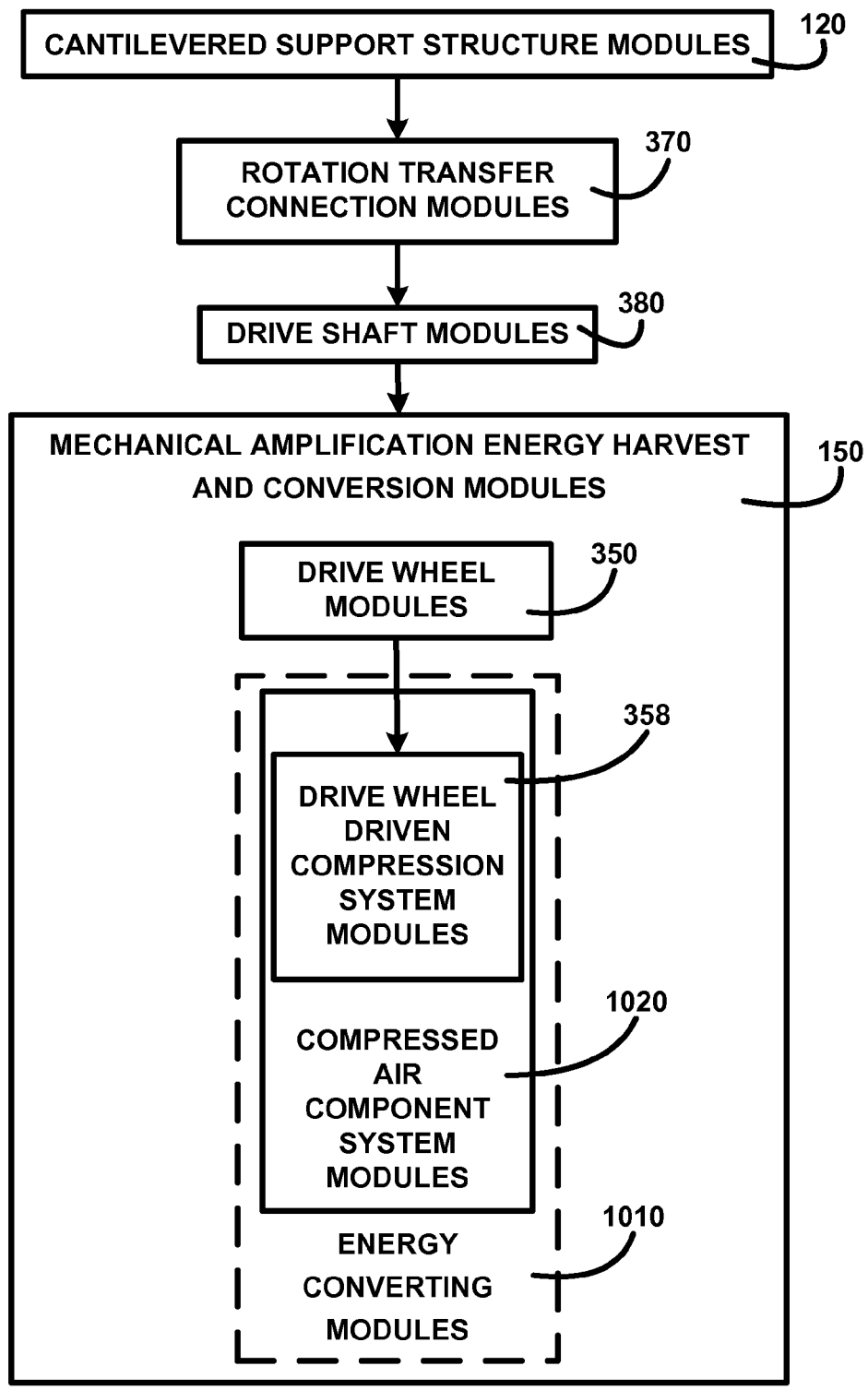
FIG. 13 shows a block diagram of mechanical amplification of one embodiment of the present invention.

Mechanical Amplification:

FIG. 13 shows a block diagram of mechanical amplification of one embodiment of the present invention. FIG. 13 shows the rotation of the cantilevered support structure modules 120 can be configured to be transferred by attachment to the rotation transfer connection modules 370. The rotation transfer connection modules 370 can be configured to transfer the rotation to the drive shaft modules 380 by attachment to the drive shaft modules 380. The drive shaft modules 380 can be configured for example to be elongated cylinders that attach to the bearing attachment modules 125 of FIG. 1 and for example the tube frame support structure modules 400 of FIG. 4 by attachment to the rotation transfer connection modules 370 of one embodiment of the present invention.

The drive shaft modules 380 can be configured for example to be elongated cylinders of a diameter greater than the mounting apparatus 105 of FIG. 1 and would be installed concentrically with the mounting apparatus 105 of FIG. 1. The drive wheel modules 350 can be configured to attach to the drive shaft modules 380 and rotate concurrently with for example the combined connected structure of for example the tube frame support structure modules 400 of FIG. 4, the drive shaft modules 380 and all objects connected or attached to either one or both of these modules of one embodiment of the present invention.

The drive wheel modules 350 can be configured to transfer rotation to the mechanical amplification energy harvest and conversion modules 150 to allow harvesting of mechanical energy. The mechanical amplification of the rotational energy in the drive wheel modules 350 can be produced by the positioning of the energy converting modules 1010 to contact the drive wheel modules 350 at radial distances from the drive shaft modules 380 that are rotating at tangentially increased speeds. The energy converting modules 1010 can be configured to be compressed air component system modules 1020.

The compressed air component system modules 1020 can be configured to be drive wheel driven energy conversion modules 358 that rotate by contact with the drive wheel modules 350 of one embodiment of the present invention.

Figure 14:
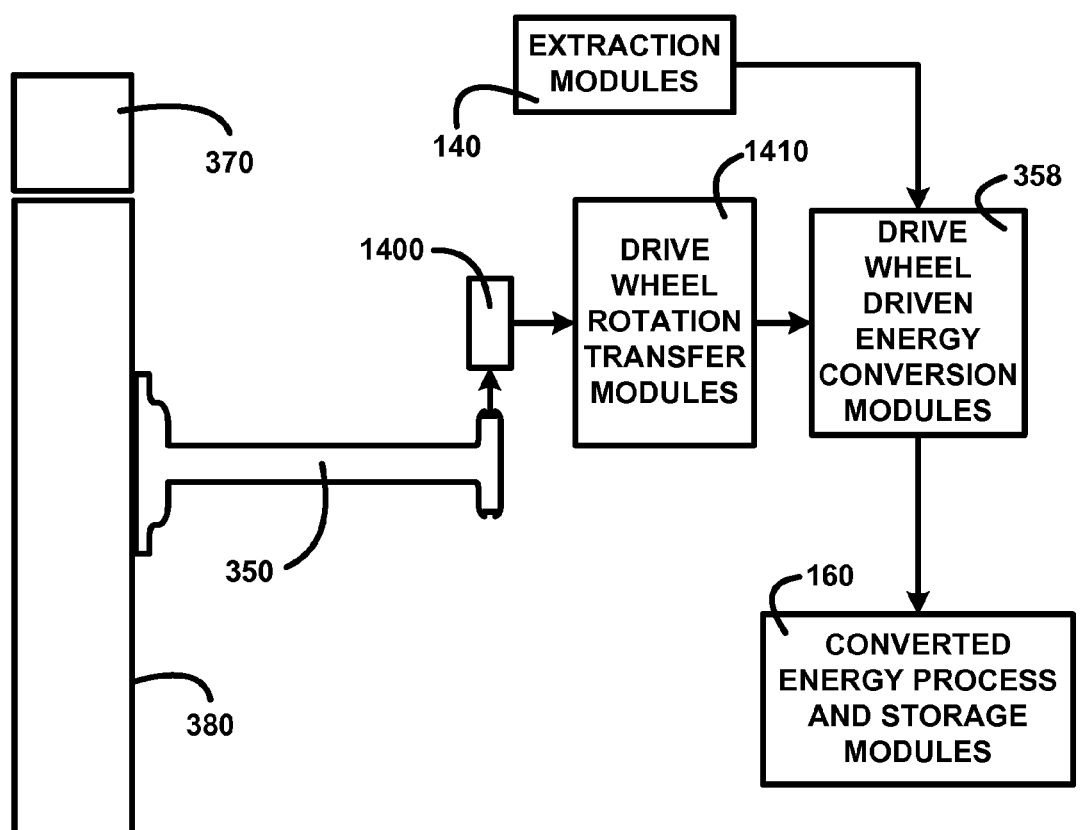
FIG. 14 shows a flow chart of mechanical contact energy harvesting modules of one embodiment of the present invention.

Mechanical Contact Energy Harvesting Modules:

FIG. 14 shows a flow chart of mechanical contact energy harvesting modules of one embodiment of the present invention. FIG. 14 shows a the rotation transfer connection modules 370 attached to the drive shaft systems modules 380 to transfer rotation to drive wheel modules 350. The rotational energy of the drive wheel modules 350 creates torque from the total weight of the combined elements of the cantilevered support structure modules 120 and all modules and equipment attached and connect to it that are rotating by the power of the wind.

Mechanical contact energy harvesting modules 1400 make contact with the drive wheel modules 350 using for example a contact wheel. The mechanical contact energy harvesting modules 1400 by contacting the outer edges of the drive wheel modules 350 rotate at tangentially amplified speed and with the force of the torque created in the drive wheel modules 350 of one embodiment of the present invention.

The tangentially amplified speed and torque from the rotating mechanical contact energy harvesting modules 1400 is transferred through the mechanical harvested energy transfer modules 1410 using for example a series of belts and pulleys which by gear ratio can be configured to further increase the speed of rotation. The harvested mechanical energy is transferred to the drive wheel driven energy conversion modules 358. The drive wheel driven energy conversion modules 358 can be configured to for example gas compressors to convert the harvested mechanical energy to high pressure compressed gas to use for example to generate electricity. The converted harvested mechanical energy is conveyed from the drive wheel driven energy conversion modules 358 to the converted energy process and storage modules 160 to use for example to power the electricity generation modules 170 of one embodiment of the present invention.

Figure 15:
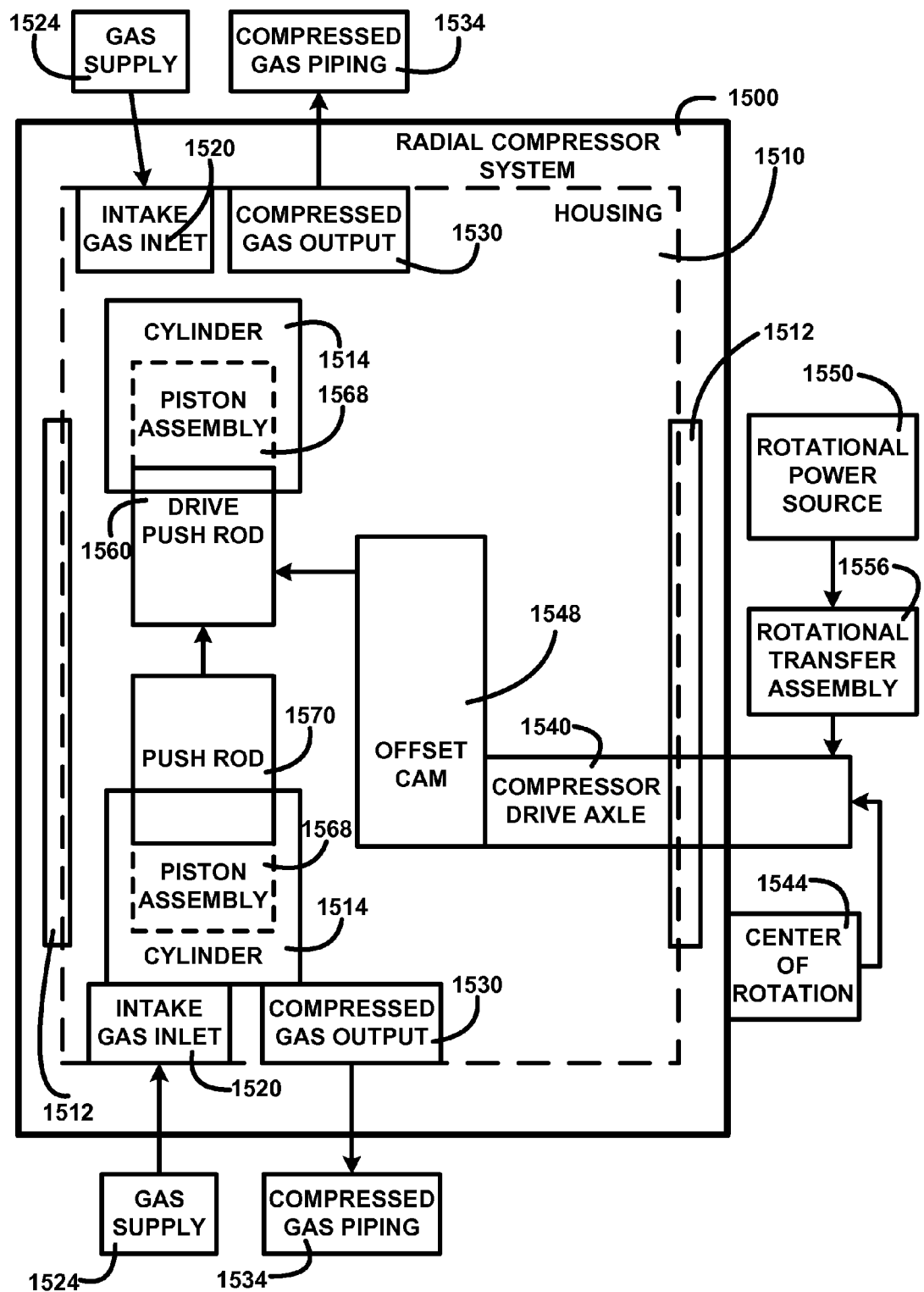
FIG. 15 shows a block diagram of an overview of a radial compressor system of one embodiment of the present invention.

Radial Compressor System:

FIG. 15 shows a block diagram of an overview of a radial compressor system of one embodiment of the present invention. In one embodiment of the present invention compressed gas is used for example to operate the electric generators. Producing a large volume of compressed air from the rotational forces imparted by light winds is desirable for the operation. The speed of the rotation available will vary greatly from slow to very fast. In one embodiment of the present invention the angles of the series of force vectors created by the multiple axes of rotation and pivoting connection points are constantly changing during the rotation from a compressor drive axle 1540 to a offset cam 1548 to the connection to a drive push rod 1560 axle to a push rod 1570 axle to the terminal connection to a piston assembly 1568. The angles of the series of force vectors are constantly changing during rotation thereby widely distributing the opposing forces to the rotation lessening the impedance to the rotation. Piston compressors generally produce higher pressures. Higher pressure compression allows optimal utilization of the compressed gas storage containment capacity of one embodiment of the present invention.

A radial compressor system 1500 shown in FIG. 15 is a high volume high pressure piston compressor system that is scalable with the same operational characteristics allowing the compressor to operate in low to high torque conditions and at a wide range of rotational speeds. The scalability of a compression device using the radial compressor system 1500 allows adaptable sizing. Scalable compression devices can easily accommodate the numerous locations within the present invention where the space available for compression devices varies from very compact to larger open areas.

The radial compressor system 1500 includes a housing 1510 which includes an access panel 1512 on two sides to provide easy assembly and maintenance of various parts. The housing 1510 includes cylinder 1514 casings that can be permanently integrated into the housing 1510 or removable and interchangeable with connections to the housing 1510. The outside terminal end of each cylinder 1514 casing has ports for one or more intake gas inlet 1520 for receiving a filtered gas supply 1524 and one or more compressed gas output 1530 for connection to compressed gas piping 1534 collection systems of one embodiment of the present invention.

Installed within the housing 1510 is a compressor drive axle 1540 which extends outside the housing through one access panel 1512. The longitudinal axis of the compressor drive axle 1540 is the center of rotation 1544 for the operation. A rotational power source 1550 transfers rotation through a rotational transfer assembly 1556 to the compressor drive axle 1540. The rotation of the compressor drive axle 1540 powers the operation of the radial compressor system 1500. Connected to the compressor drive axle 1540 within the housing 1510 is an offset cam 1548 which is used to transfer asymmetrical rotation to the linkage which drives the pistons of one embodiment of the present invention.

One drive push rod 1560 is connected to the offset cam 1548 with a pivoting drive push rod axle. The position of the drive push rod axle to the offset cam 1548 is offset from the longitudinal axis of the compressor drive axle 1540. The offset position from the longitudinal axis of the compressor drive axle 1540 causes the center of the pivoting motion of the drive push rod 1560 which is the longitudinal axis of the drive push rod axle, to orbit around the center of rotation 1544 of the compressor drive axle 1540.

The one drive push rod 1560 extends into the space created by one cylinder 1514. Connected to the end of the drive push rod 1560 that extends into cylinder 1514 is a piston assembly 1568 that is fitted to the interior cylinder 1514 walls. The piston assembly 1568 includes a piston head that incorporates a sealing system to contain the increasing gas pressure as the piston assembly is pushed to the outer end of the cylinder 1514. The sealing system can be for example multiple sets of a concentric piston ring and spring of one embodiment of the present invention.

The one drive push rod 1560 has positioned around the drive push rod axle connections point for one or more push rod 1570 attachments. The number of cylinder 1514 chambers radially positioned on the housing 1510 will equal the total number push rod 1570 components plus one for the drive push rod 1560. The push rod 1570 attachment is made with a pivoting push rod axle. The push rod 1570 points of connection on the drive push rod 1560 are equally spaced in a radial pattern. Each push rod 1570 extends into the space created by one cylinder 1514 corresponding to the push rod 1570 point of connection. Connected to the end of the push rod 1570 that extends into cylinder 1514 is a piston assembly 1568 of one embodiment of the present invention.

The rotation of the compressor drive axle 1540 and offset cam 1548 causes an ordered reciprocating stroke of the drive push rod 1560 and each push rod 1570 and piston assembly 1568 combination. The inward stroke draws lower pressured gas from the gas supply 1524 through the intake gas inlet 1520 into the cylinder 1514 chamber as the piston head retreats. The outward stroke pushes the piston head toward the outer end of the cylinders 1514 thereby reducing the volume of the gas in the cylinder chamber and causing an increase in pressure. The compressed gas is released through the compressed gas output 1530 to the compressed gas piping 1534. Each intake gas inlet 1520 and each compressed gas output 1530 will include a one-way check valve. A one-way check valve will allow gas from the gas supply 1524 to pass through the intake gas inlet 1520 into the cylinder 1514 chamber during the inward stroke. The valve will shut during the outward stroke allowing the build up of pressure. A one-way check valve will prevent compressed gas to reenter the cylinder 1514 chamber through the compressed gas output 1530 during the inward stroke. The valve will open as the pressure builds during the outward stroke of one embodiment of the present invention.

The rotational motion is continuous and each piston assembly 1568 completes a stroke cycle during each full revolution. In one embodiment the configuration of a radial compressor system 1500 can for example include different diameter cylinders with the same stroke distance allowing for multiple stages of compression within the same device thereby reducing the force required for the compression operation. In another embodiment the configuration of a radial compressor system 1500 can for example include two devices scaled to different sizes and device rotated by connecting the two compressor drive axle 1540 components and operated by the same the rotational power source 1550 allowing the first device to operate at a lower output pressure to feed compressed gas into the second device for a second stage compression operation to reduce the amount of force required for the compression operation. The output pressure can be changed for example by reducing the size of the fittings connected to the compressed gas output 1530 openings. In one embodiment the inner surface of the cylinders can be coated with for example a Teflon coating and the piston sealing system include Teflon coated rings to reduce friction of one embodiment of the present invention.

Figure 16A:
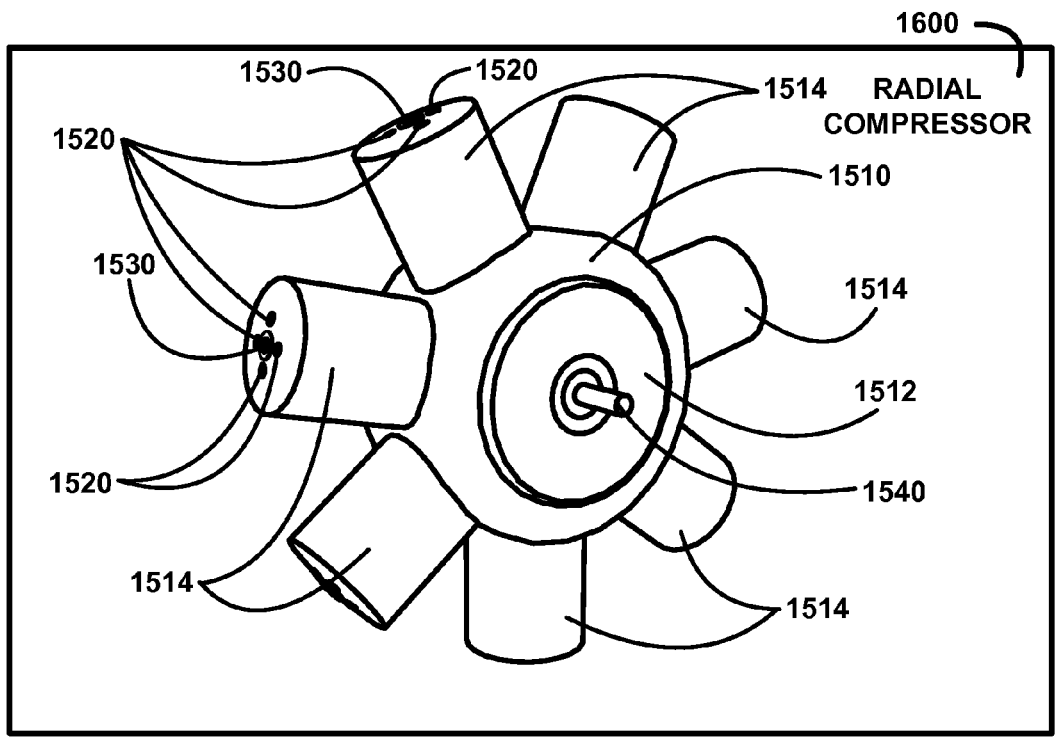
FIG. 16A shows for illustrative purposes only an example a radial compressor in an external prospective view of one embodiment of the present invention.

FIG. 16A shows for illustrative purposes only an example a radial compressor in an external prospective view of one embodiment of the present invention. FIG. 2A shows an example of a radial compressor 1600 which is configured to include seven cylinder 1514 chambers connected to the housing 1510 and radially equally spaced radially around the housing 1510. FIG. 2A shows one removable access panel 1512 connected to the housing 1510 and protruding through the access panel 1512 is the compressor drive axle 1540. The outer end of the cylinder 1514 is shown configured with one or more intake gas inlet 1520 and the compressed gas output 1530 of one embodiment of the present invention.

Figure 16B:
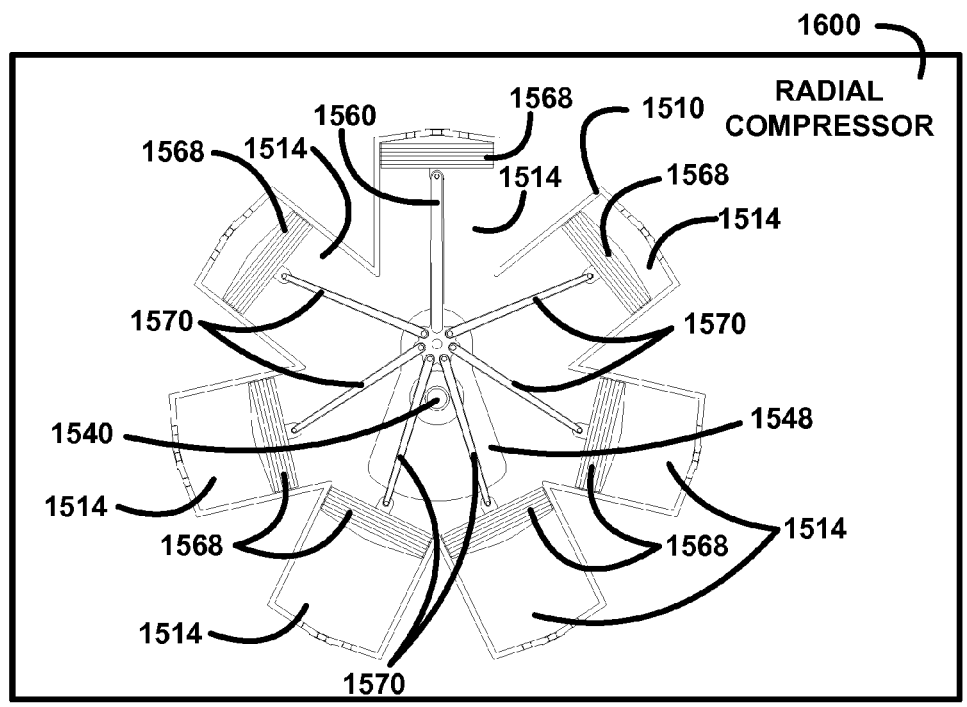
FIG. 16B shows for illustrative purposes only an example a radial compressor in an internal view of one embodiment of the present invention.

FIG. 16B shows for illustrative purposes only an example a radial compressor in an internal view of one embodiment of the present invention. The interior of the radial compressor 1600 shows installed in the housing 1510 and each cylinder 1514 the internal parts which operate by the rotation of the compressor drive axle 1540. The internal view shows the connection of the compressor drive axle 1540 to the offset cam 1548 to the connection to the drive push rod 1560 axle to the push rod 1570 axle to the terminal connection to the piston assembly 1568 of one embodiment of the present invention.

Figure 17:
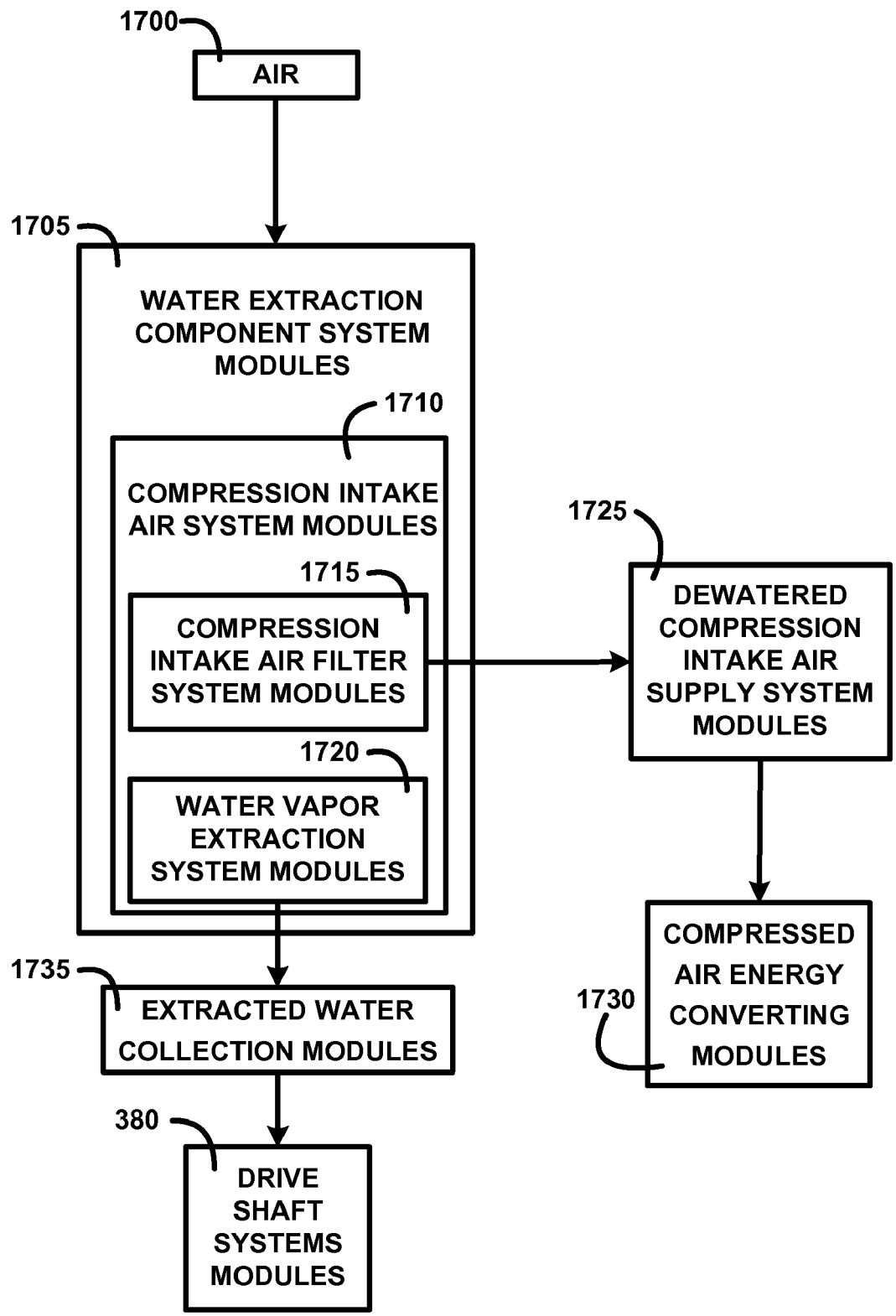
FIG. 17 shows a block diagram of water extraction component system modules of one embodiment of the present invention.

Water Extraction Component System Modules:

FIG. 17 shows a block diagram of water extraction component system modules of one embodiment of the present invention. The wind powered energy amplification modularized system 110 of FIG. 1 can be configured to extract water from the air to use to supply water 184 of FIG. 1. The conversion of energy can be configured to include air compressors to compress air to high pressure. FIG. 17 shows water extraction component system modules 1705 that can be configured to extract water and provide intake air to air compressors that has been dewatered of one embodiment of the present invention.

FIG. 17 shows air 1700 which is forced or drawn into water extraction component system modules 1705 to compression intake air system modules 1710. The compression intake air system modules 1710 can be configured to include compression intake air filter system modules 1715 to supply air to dewatered compression intake air supply system modules 1725.

The dewatered compression intake air supply system modules 1725 convey the dewatered intake air to supply intake air to compressed air energy converting modules 1730. The compressed air energy converting modules 1730 use the less humid intake air to compress the air to high pressure compressed air which for example is a useful form of converted energy to operate electricity generation modules 170 of FIG. 1 of one embodiment of the present invention.

The compression intake air system modules 1710 can be configured to include water vapor extraction system modules 1720 to remove water vapor from the air by using for example condensation. The water vapor extraction system modules 1720 convey the extracted water through extracted water collection modules 1735 to be further processed by drive shaft systems modules 380 of one embodiment of the present invention.

Figure 18:
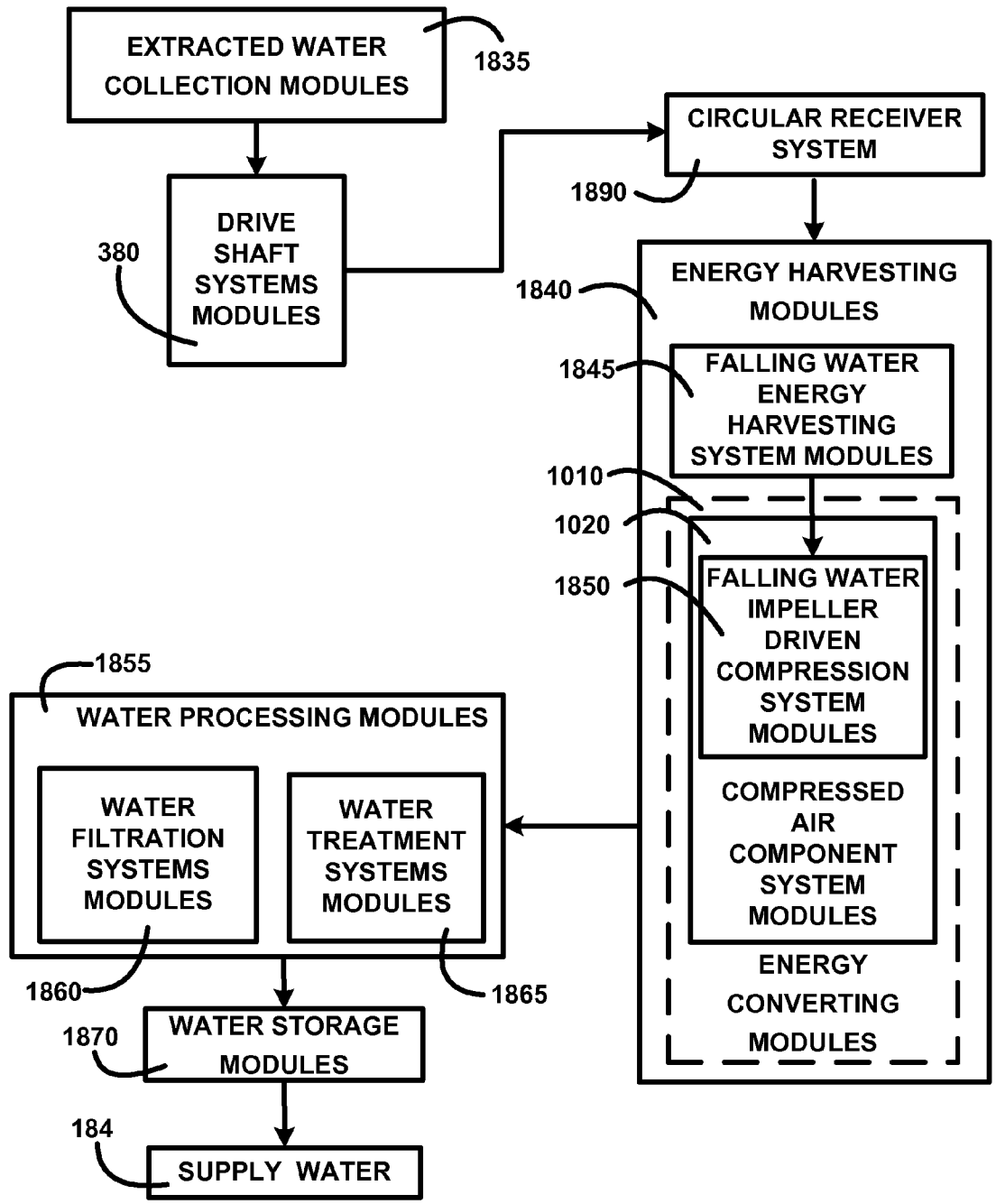
FIG. 18 shows a block diagram of falling water energy harvesting system modules of one embodiment of the present invention.

Falling Water Energy Harvesting System Modules:

FIG. 18 shows a block diagram of falling water energy harvesting system modules of one embodiment of the present invention. The mechanical amplification energy harvest and conversion modules 150 can be configured to include energy harvesting modules 1840.

The energy harvesting modules 1840 can include falling water energy harvesting system modules 1845 which can be configured as one of the energy converting modules 1010.

One element of the energy converting modules 1010 are the compressed air component system modules 1020 that can be configured to include falling water impeller driven compression system modules 1850 of one embodiment of the present invention.

The falling water energy harvesting system modules 1845 uses the water from extracted water collection modules 1835 collected through the drive shaft systems modules 380 including a circular receiver system 1890 which falls from the height of the circular receiver system 1890 and can be configured to harvest the energy of the falling water and converted that energy into a useful form. The falling water impeller driven compression system modules 1850 converts the falling water energy into compressed air by using the falling water to rotate an impeller connected to an air compressor. The water after leaving the impeller flows to water processing modules 1855 that can be configured to include water filtration systems modules 1860 and water treatment systems modules 1865 for processing the water before it flows to water storage modules 1870 to supply water 184 of one embodiment of the present invention.

Circular Receiver System:

It should be noted that the descriptions that follow, for example, in terms of water are described for illustrative purposes and the underlying flow technology can apply to any liquids and gases. In one embodiment of the present invention, water extracted from the air is conveyed through the circular receiver assembly modules in another embodiment the converted energy for example compressed air can be conveyed through the circular receiver assembly modules.

Figure 19A:
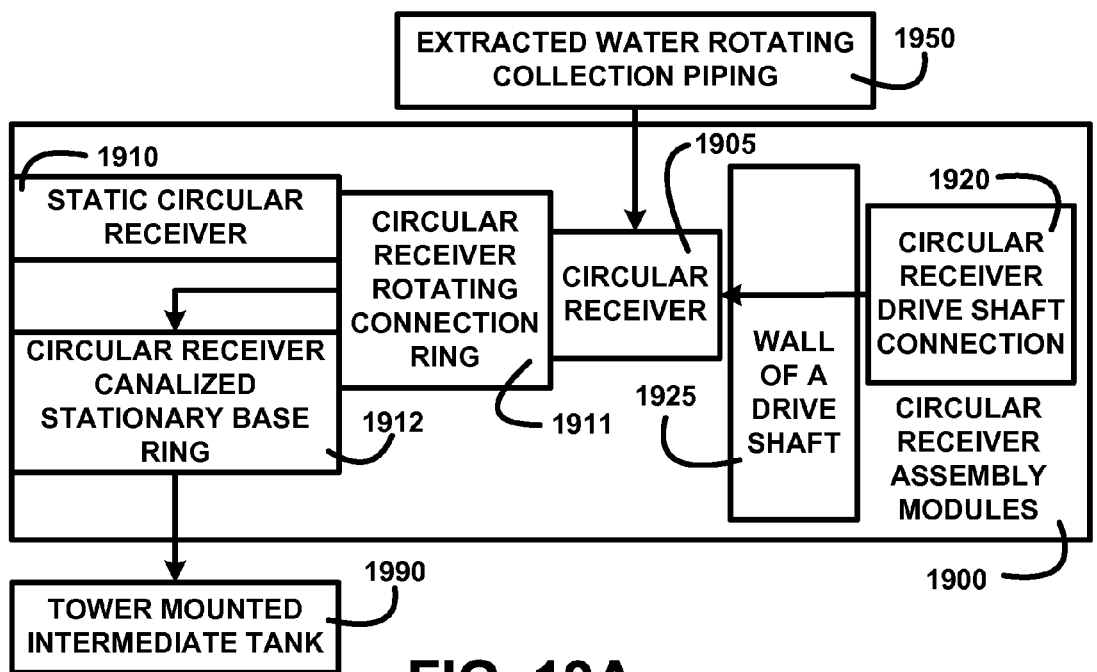
FIG. 19A shows a flow chart of an example of a circular receiver assembly modules of one embodiment of the present invention.

FIG. 19A shows a flow chart of an example of a circular receiver assembly modules of one embodiment of the present invention. In one embodiment of the present invention elements of the cantilevered support structure modules 120 of FIG. 1 can be rotating above ground and the air flow amplification energy harvest and conversion modules 130 of FIG. 1 and the extraction modules 140 of FIG. 1 connected to the above ground elements can be passing converted energy for example compressed air and extracted water to the converted energy process and storage modules 160 of FIG. 1 for example on the ground. The circular receiver assembly modules 1900 form transitional connection devices to allow the collection systems used to convey the converted energy and extracted water to transition from a rotating state to a stationary state. FIG. 19A shows an example of the circular receiver assembly modules 1900 used to provide a transitional connection device for extracted water rotating collection piping 1950 to change from a rotating state to a stationary state.

The circular receiver assembly modules 1900 have five main elements. The first is the circular receiver canalized stationary base ring 1912 which bolts onto a tower mounted platform and forms the bottom half of the receiving trough for the compressed air or liquid water. Second is the circular receiver rotating connection ring 1911 which when rotating slides in the track on the outer portion of the circular receiver canalized stationary base ring 1912 and has the connection for the product flow.

Third is the static circular receiver 1910 that forms the top half of the receiving trough for the compressed air or liquid water and is bolted to the circular receiver canalized stationary base ring 1912. Fourth is the circular receiver 1905 which is connected to the circular receiver rotating connection ring 1911 is the rotating connection of the collection piping the circular receiver assembly modules 1900. Fifth is the circular receiver drive shaft connection 1920 which joins the circular receiver assembly modules 1900 to the wall of a drive shaft 1925 of one embodiment of the present invention.

The circular receiver 1905 is connected to the wall of a drive shaft 1925 by the attachment of the circular receiver drive shaft connection 1920 through the wall of a drive shaft 1925. The connection to the wall of a drive shaft 1925 rotates the circular receiver drive shaft connection 1920, the circular receiver 1905 and the circular receiver rotating connection ring 1911 concurrently with the extracted water rotating collection piping 1950. The circular receiver rotating connection ring 1911 rotates in two tracks formed by the static circular receiver 1910 and the circular receiver canalized stationary base ring 1912. The rotating elements of the circular receiver assembly modules 1900 thereby provide a rotating discharge connection for the extracted water rotating collection piping 1950 and the flow of water from the rotating elements flows into the stationary elements to discharge to stationary piping to a tower mounted intermediate tank 1990 of one embodiment of the present invention.

The extracted water rotating collection piping 1950 is connected to an opening in the circular receiver 1905. Water flows from the extracted water rotating collection piping 1950 and flows through the circular receiver 1905 to the corresponding opening in the circular receiver rotating connection ring 1911. The water is discharged from the rotating circular receiver rotating connection ring 1911 to a receiving chamber.

The receiving chamber is formed by the assembly of the circular receiver rotating connection ring 1911, static circular receiver 1910 and circular receiver canalized stationary base ring 1912. The water flows out of the receiving chamber through an opening in the circular receiver canalized stationary base ring 1912 to the tower mounted intermediate tank 1990 of one embodiment of the present invention.

Figure 19B:
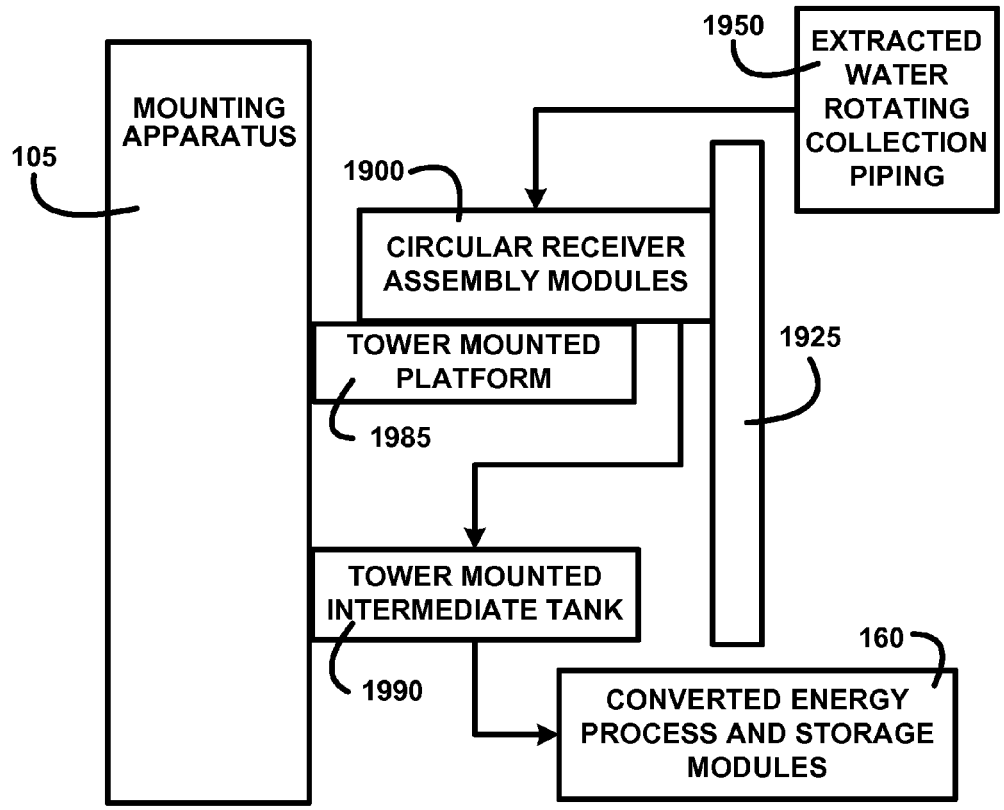
FIG. 19B shows a block diagram of an example of a circular receiver assembly modules installation of one embodiment of the present invention.

FIG. 19B shows a block diagram of an example of a circular receiver assembly modules installation of one embodiment of the present invention. FIG. 19B shows a tower mounted platform 1985 connected to the mounting apparatus 105. The circular receiver assembly modules 1900 are connected to the tower mounted platform 1985. The extracted water rotating collection piping 1950 connected to the rotating structure is connected to the circular receiver assembly modules 1900 connected to the tower mounted platform 1985. The transition of the flowing water from a rotating state to a stationary state is processed by the circular receiver assembly modules 1900. The water discharged from the circular receiver assembly modules 1900 to the tower mounted intermediate tank 1990 can then for example be conveyed to the converted energy process and storage modules 160 of one embodiment of the present invention.

Figure 20:
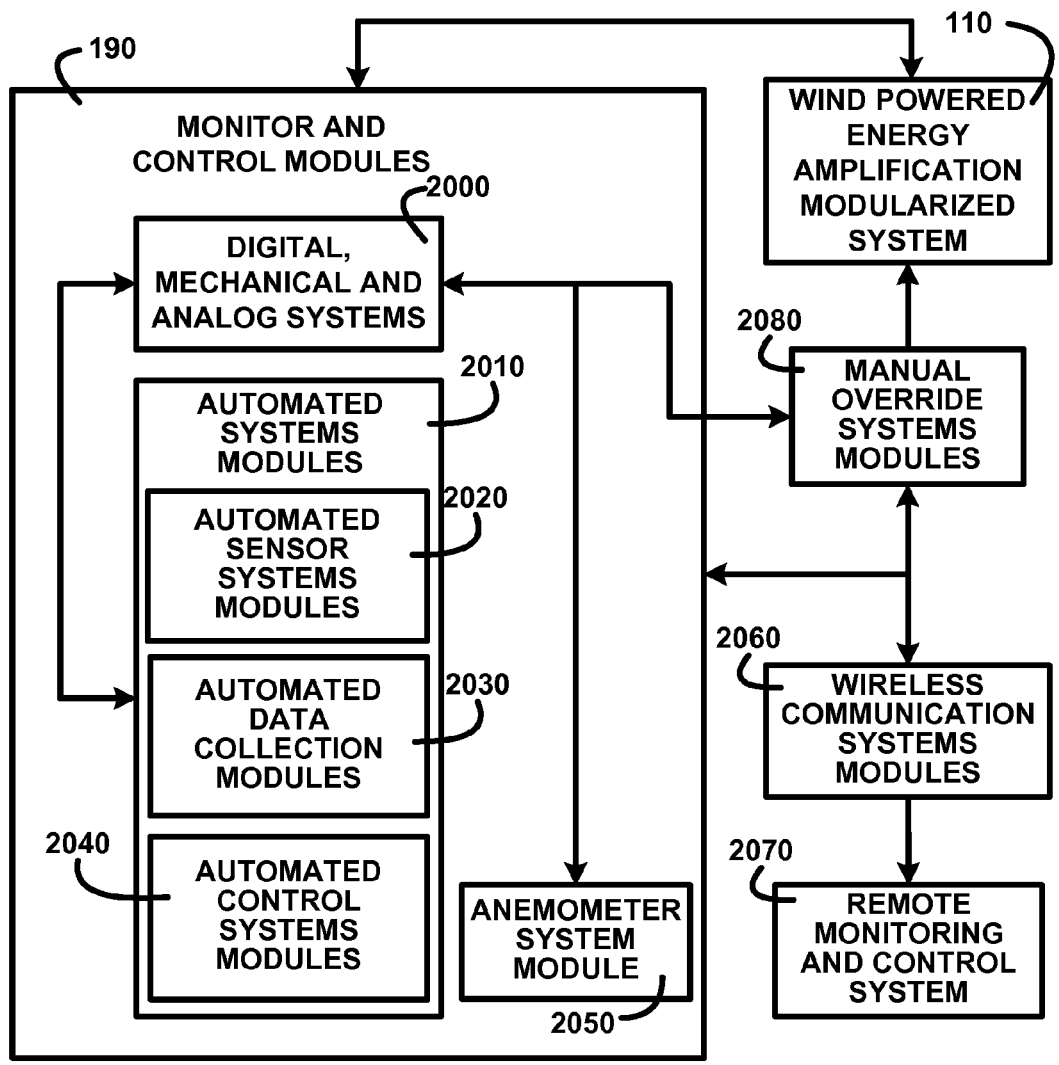
FIG. 20 shows a block diagram of monitor and control modules of one embodiment of the present invention.

Monitor and Control Modules:

FIG. 20 shows a block diagram of monitor and control modules of one embodiment of the present invention. FIG. 20 shows an example of the monitor and control modules 190 configured to for example to measure, control, record and transmit operating conditions and levels of the wind powered energy amplification modularized system 110 elements. In one embodiment the monitor and control modules 190 can be configured to for example use digital, mechanical and analog systems 2000. In one embodiment the digital, mechanical and analog systems 2000 can be configured to include automated systems modules 2010 for example automated sensor systems modules 2020, automated data collection modules 2030, automated control systems modules 2040 and an anemometer system module 2050. In one embodiment the digital, mechanical and analog systems 2000 can be configured to use wireless communication systems modules 2060 to access the monitor and control modules 190 and to for example use a remote monitoring and control system 2070. In one embodiment the digital, mechanical and analog systems 2000 can be configured to use manual override systems modules 2080 for example to override automated systems to alter operating conditions during maintenance operations. The monitor and control modules 190 can be configured to for example use the anemometer system module 2050 wind speed data to from a remote location control the wind capture modules 115 to slow the rotation of the cantilevered support structure modules 120.

Figure 21:
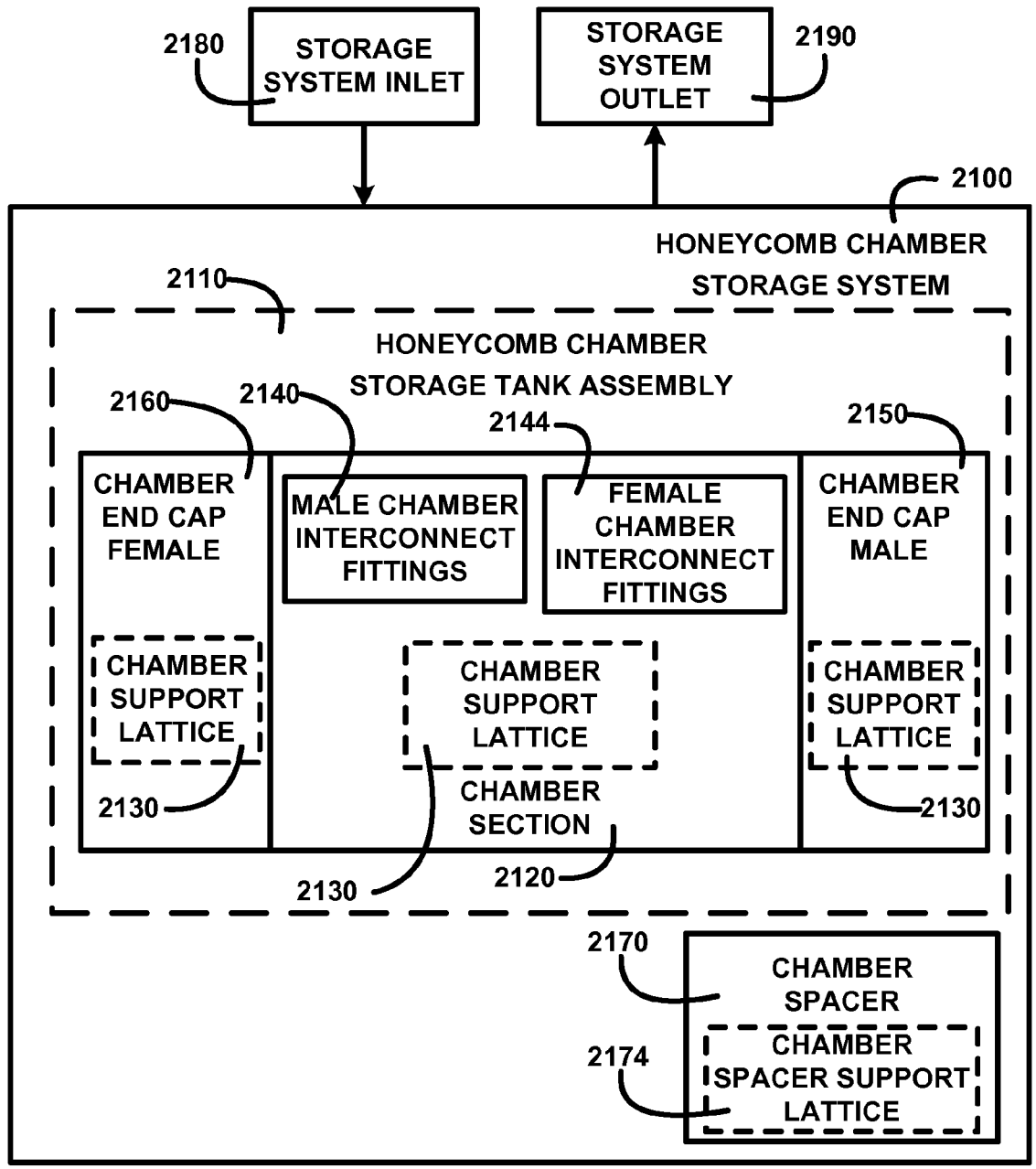
FIG. 21 shows a block diagram of an example of a honeycomb chamber storage system of one embodiment of the present invention.

Honeycomb Chamber Storage System:

FIG. 21 shows a block diagram of an example of a honeycomb chamber storage system of one embodiment of the present invention. FIG. 21 shows a honeycomb chamber storage system 2100 which can be for example an element of the converted energy process and storage modules 160 used to store converted energy for use in the electricity generation modules 170. Compressed gas storage containment can be for example storage tanks made of strong metal or composite materials or be underground vaults that are air tight. In one embodiment of the present invention compressed gas storage containment can be configured to underground vaults that are air tight using a honeycomb chamber storage system 2100 for the underground vaults of one embodiment of the present invention.

The honeycomb chamber storage system 2100 can be for example made of recycled plastics. Underground compressed gas storage can for example gain structural strength from the compacted soil that encases the storage structure thereby allowing the use of less expensive materials for the fabrication. The honeycomb chamber storage system 2100 can be a honeycomb chamber storage tank assembly 2110 comprised of component section modules to allow adaptable sizing and installations. The honeycomb chamber storage tank assembly 2110 is a system of storage chambers configured to an extended hexagonal form to allow stable stacking of the units in for example an excavation of one embodiment of the present invention.

A chamber section 2120 can be configured to be structurally reinforced with one or more chamber support lattice 2130. The chamber section 2120 can be configured to include male chamber interconnect fittings 2140 and female chamber interconnect fittings 2144 to allow the interconnection of stacked units of the honeycomb chamber storage tank assembly 2110 to allow the free flow of a compressed gas between units. A chamber end cap male 2150 structurally reinforced with one or more chamber support lattice 2130 and a chamber end cap female 2160 structurally reinforced with one or more chamber support lattice 2130 are attached to the ends of the chamber elements to seal the honeycomb chamber storage tank assembly 2110 and to form a compressed gas storage containment. A chamber spacer 2170 structurally reinforced with one or more chamber spacer support lattice 2174 can be used for example to stabilize the bottom layer of honeycomb chamber storage tank assembly 2110 units in an installation. The honeycomb chamber storage system 2100 can be configured with a storage system inlet 2180 configured to allow the controlled filling of the storage units with a compressed gas. The honeycomb chamber storage system 2100 can be configured with a storage system outlet 2190 configured to allow the controlled release of the compressed gas in the storage units of one embodiment of the present invention.

Figure 22A:
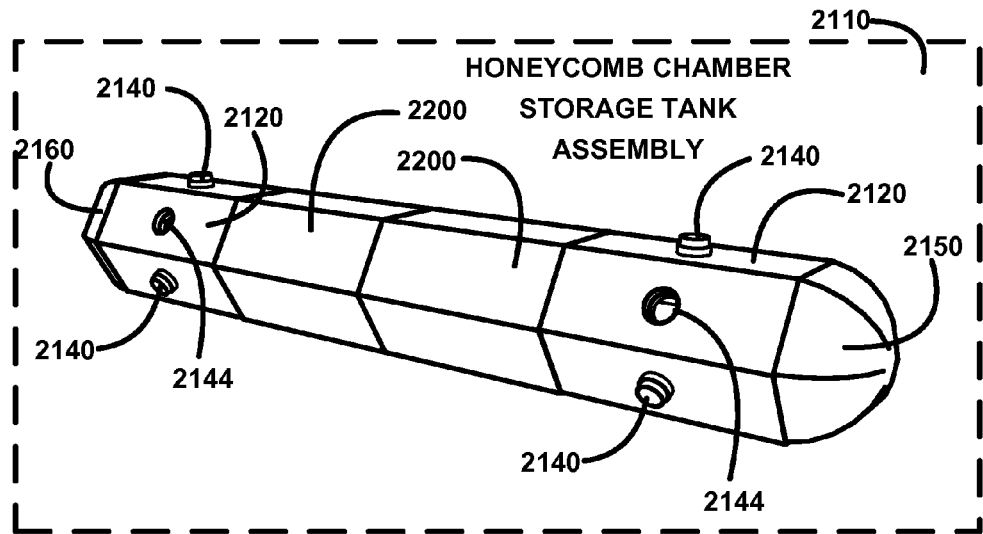
FIG. 22A shows for illustrative purposes only an example of a honeycomb chamber storage tank assembly of one embodiment of the present invention.

FIG. 22A shows for illustrative purposes only an example of a honeycomb chamber storage tank assembly of one embodiment of the present invention. FIG. 22A shows an example of the honeycomb chamber storage tank assembly 2110 assembled from elements of the honeycomb chamber storage system 2100 of FIG. 21. In one embodiment the chamber end cap female 2160 is attached to the chamber section 2120 which includes male chamber interconnect fittings 2140 and female chamber interconnect fittings 2144. The adaptability of the modularized elements of the honeycomb chamber storage system 2100 of FIG. 21 allows the expansion of the volume of the storage capacity by the addition of one or more chamber extension 2200 to the honeycomb chamber storage tank assembly 2110. In the example shown in FIG. 22A two of the chamber extension 2200 elements are shown being attached to one of the chamber section 2120 elements of one embodiment of the present invention.

In the example shown in FIG. 22A a second chamber section 2120 is attached to the second chamber extension 2200 and the assembly is completed with the attachment of the chamber end cap male 2150. The honeycomb chamber storage system 2100 of FIG. 21 can be configured for example wherein multiple chamber extension 2200 elements can be attached to one chamber section 2120. The honeycomb chamber storage system 2100 of FIG. 21 can be configured for example wherein attachments of chamber section 2120 and chamber extension 2200 elements can be alternated in various combinations of one embodiment of the present invention.

Figure 22B:
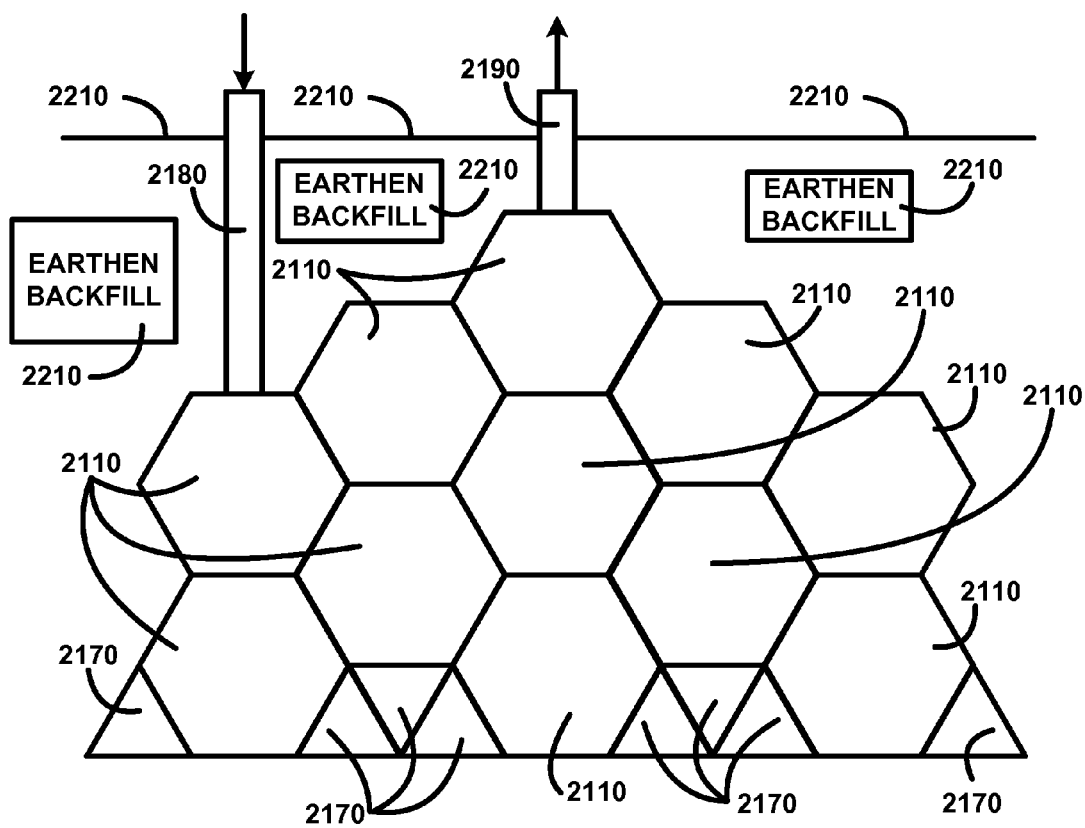
FIG. 22B shows a block diagram of an example of a honeycomb compressed air storage system installed below ground of one embodiment of the present invention.

FIG. 22B shows a block diagram of an example of a honeycomb compressed air storage system installed below ground of one embodiment of the present invention. FIG. 22B shows an example of the honeycomb chamber storage system 2100 of FIG. 21 installed below ground. An example of the installation of the honeycomb chamber storage system 2100 of FIG. 21 can be a number of the honeycomb chamber storage tank assembly 2110 units stacked in an excavation using the chamber spacer 2170 elements to create a stable bottom layer upon which other honeycomb chamber storage tank assembly 2110 units can be stacked interlocking the hexagonal chamber sections to maintain stability.

The male chamber interconnect fittings 2140 of FIG. 21 and female chamber interconnect fittings 2144 of FIG. 21 provide interconnection of adjacent chambers to allow the free flow of compressed gas though out the combined containment volume. The storage system inlet 2180 and storage system outlet 2190 elements provide for example a piping route for example including digitally controllable valves to allow remote and automated filling and release of the compressed gas from the containment of one embodiment of the present invention.

In one embodiment upon completion of the installation of the honeycomb chamber storage system 2100 of FIG. 21 modules an earthen backfill 2220 encloses the installation to a ground level 2210. The use of the honeycomb chamber storage system 2100 of FIG. 21 in a below ground installation conserves surface area at the ground level 2210 that once backfilled can for example be used for parking. In one embodiment the honeycomb chamber storage system 2100 of FIG. 21 elements fabricated from for example recycled plastics and having added containment strength from the earthen backfill 2220 can for example provide an economical system for the storage of high pressure compressed gas for use for example in the generation of electricity of one embodiment of the present invention.

Figure 23A:
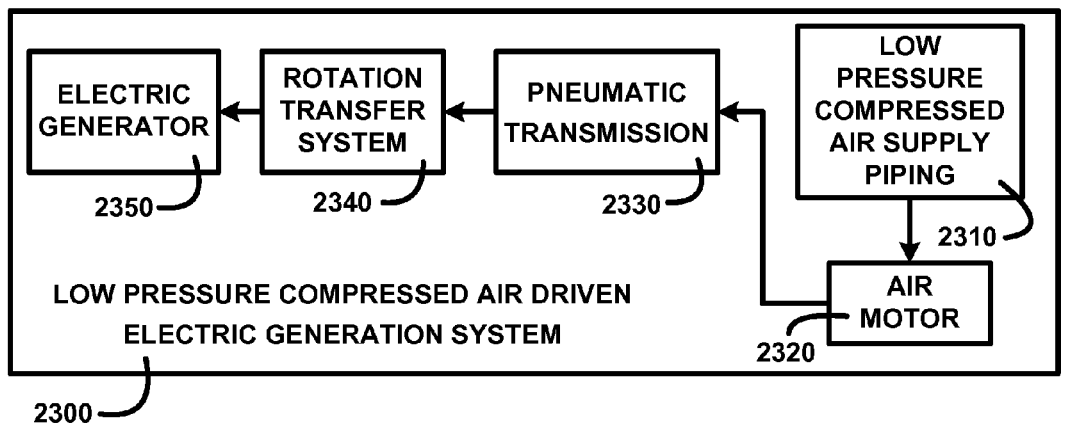
FIG. 23A shows a block diagram of an example of electricity generation modules of one embodiment of the present invention.

Electricity Generation Modules:

FIG. 23A shows a block diagram of an example of electricity generation modules of one embodiment of the present invention. The electricity generation modules 170 can be configured to operate for example as a low pressure compressed air driven electric generation system 2300. The low pressure compressed air driven electric generation system 2300 can be for example supplied with low pressure compressed air through a low pressure compressed air supply piping 2310 to power the operation of an air motor 2320. The rotation of the air motor 2320 can be configured to for example be transfer rotation by connection to a pneumatic transmission 2330 to smooth out starting and stopping of the rotation. The controlled rotation of the pneumatic transmission 2330 can be configured to be connected to a rotation transfer system 2340 to an electric generator 2350. The rotation of the electric generator 2350 armature can be configured to for example be controlled by the control of the low pressure compressed air flow. A control system can be configured to increase or decrease the flow of low pressure compressed air to the air motor 2320 in adjust the rpm of the electric generator 2350 to the optimal rpm for operation of one embodiment of the present invention.

Figure 23B:
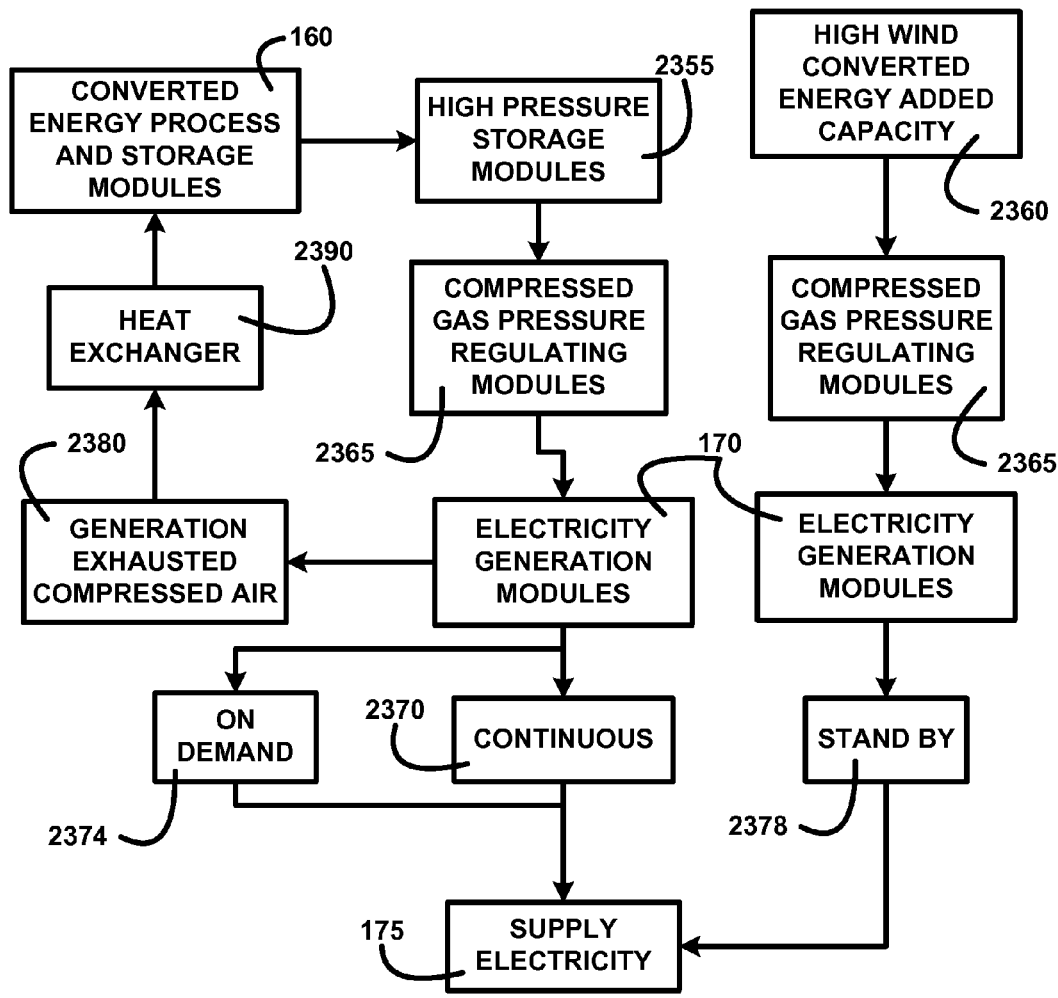
FIG. 23B shows a block diagram of an example of generating continuous, on demand and stand by electricity of one embodiment of the present invention.

FIG. 23B shows a block diagram of an example of generating continuous, on demand and stand by electricity of one embodiment of the present invention. The wind powered energy amplification method 200 of FIG. 2 can be configured using the electricity generation modules 170 for generating continuous, on demand and stand by electricity 240 of FIG. 2. A compressed gas from the converted energy process and storage modules 160 can be supplied to high pressure storage modules 2335. Compressed gas from the high pressure storage modules 2335 can be for example released on a controlled measure basis to compressed gas pressure regulating modules 2365 to provide low pressure compressed gas to the electricity generation modules 170 to on a continuous 2370 basis to supply electricity 175.

Routing of generation exhausted compressed air 2380 to a heat exchanger 2390 can for example be processed to increase the temperature of the generation exhausted compressed air 2380 to increase the pressure and return the processed generation exhausted compressed air 2380 to the converted energy process and storage modules 160 to for example by the use of the recycled generation exhausted compressed air 2380 has added capacity to supply electricity 175 on demand 2374.

The wind powered energy amplification method 200 of FIG. 2 can during periods of high wind speeds operate to produce high wind converted energy added capacity 2360. The high wind converted energy added capacity 2360 may for example produce more converted energy than can be stored and this overage of converted energy for example in the form of a compressed gas can be diverted to compressed gas pressure regulating modules 2365 and processed for use in electricity generation modules 170 used to supply electricity 175 on a stand by 2378 basis of one embodiment of the present invention.

Figure 24:
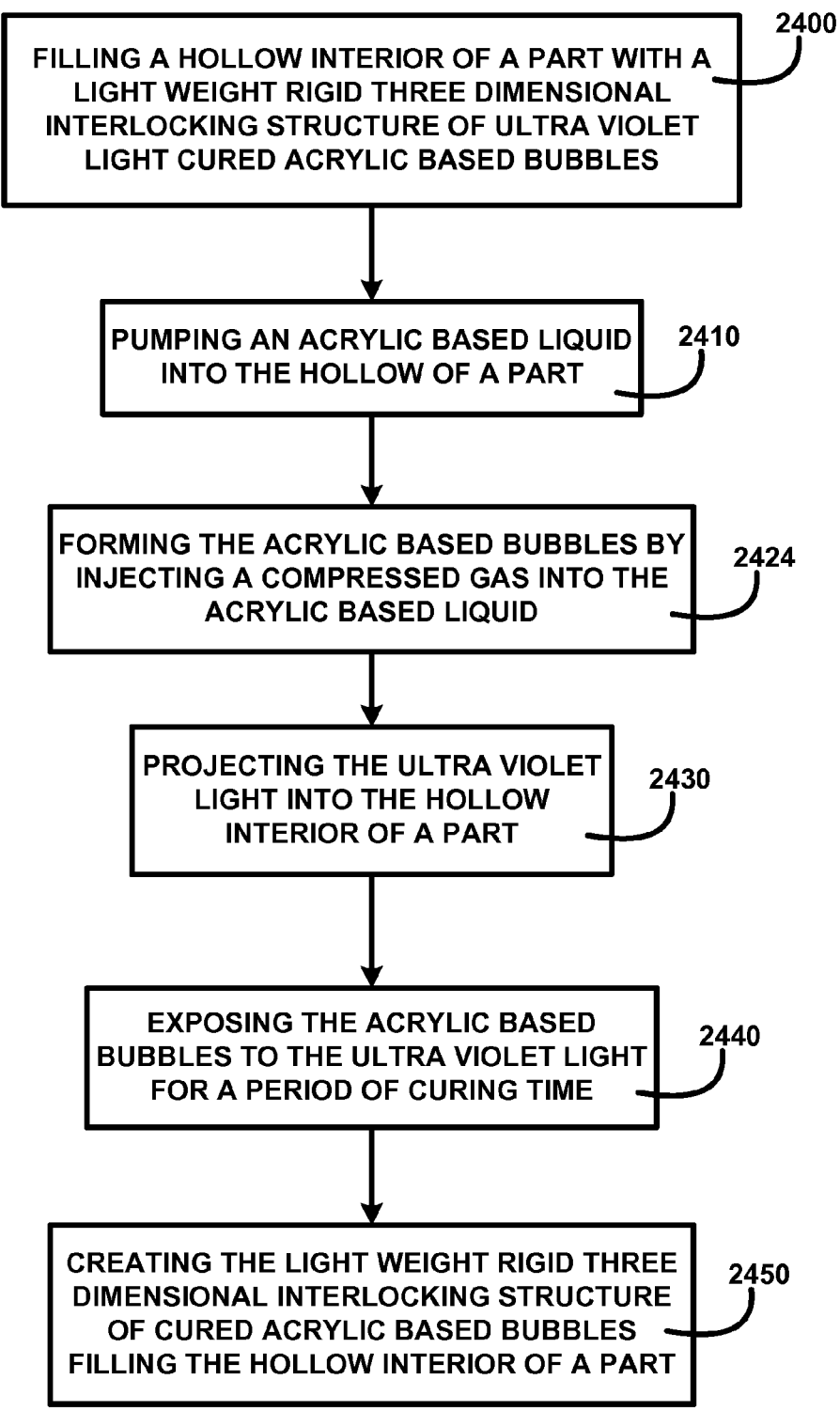
FIG. 24 shows a flow chart of an overview of a bubbling acrylic light weight filler method of one embodiment of the present invention.

Bubbling Acrylic Light Weight Filler Method:

FIG. 24 shows a flow chart of an overview of a bubbling acrylic light weight filler method of one embodiment of the present invention. A bubbling acrylic light weight filler method is a process to create light weight parts. Weight reduction in parts is desirable of one embodiment of the present invention.

In one embodiment of the present invention filling a hollow interior of a part with a light weight rigid three dimensional interlocking structure of ultra violet light cured acrylic based bubbles 2400 creates light weight parts. A process of pumping an acrylic based liquid into the hollow of a part 2410 allows forming the acrylic based bubbles by injecting a compressed gas into the acrylic based liquid 2420. Projecting the ultra violet light into the hollow interior of a part 2430 allows exposing the acrylic based bubbles to the ultra violet light for a period of curing time 2440. The curing alters the acrylic based bubbles from a liquid state to a rigid state thereby creating the light weight rigid three dimensional interlocking structure of cured acrylic based bubbles filling the hollow interior of a part 2450 of one embodiment of the present invention.

In one embodiment sizes of the acrylic based bubbles and a wall thickness of the acrylic based bubbles can be predetermined and controlled by for example adjusting the viscosity and volume of the acrylic based liquid used to form the bubbles and adjusting the pressure level and volume of compressed gas used for injecting the acrylic based liquid with the compressed gas to cause the bubble formation. The compressed gas used to form the acrylic based bubbles can be for example compressed air or compressed nitrogen gas of one embodiment of the present invention.

The light weight rigid three dimensional interlocking structure of ultra violet light cured acrylic based bubbles can for example provide a structurally supportive filling and can reduce the weight of a part by replacing solid materials with the gas filling the acrylic based bubbles. In one embodiment adjusting the curing time of the acrylic based bubbles can for example be controlled by adjusting the wavelength and intensity of ultraviolet of one embodiment of the present invention.

In one embodiment the filling of the hollow interior of a part can be processed by for example inserting an assemblage of tubes supplying an acrylic based liquid, supplying compressed gas and transmitting ultra violet light grouped in appropriate numbers and sizes with spacers allowing the acrylic based bubbling fill operation to proceed as the assemblage of tubes and spacers are drawn out of the hollow interior of a part of one embodiment of the present invention.

In one embodiment the filling of the hollow interior of a part can be processed by for example mounting on an extruder an assemblage of tubes supply an acrylic based liquid, supplying compressed gas and transmitting ultra violet light grouped in appropriate numbers and sizes with spacers in a position wherein the hollow interior of the part being extruded as the acrylic based bubbling fill operation is filling the hollow interior of the part as the extrusion is formed for example in a continuous operation of one embodiment of the present invention.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A wind powered energy amplification system to harvest, convert and store energy and extract, process and store water and carbon dioxide from air, comprising:

cantilevered support structure modules coupled to wind powered energy amplification modules;

bearing attachment modules coupled to the cantilevered support structure modules and to a mounting apparatus, wherein the bearing attachment modules are configured to allow rotation of the cantilevered support structure modules;

energy harvest and conversion modules coupled to the cantilevered support structure modules and configured to harvest and convert tangentially amplified kinetic energy;

forced rotation modules configured to control the speed of rotation and orientation of the cantilevered support structure modules from the converted tangentially amplified kinetic energy; and extraction modules configured to extract and process water and carbon dioxide from the air.

2. The wind powered energy amplification system of claim 1, further comprising wind capture modules coupled to the cantilevered support structure modules and configured to create rotation using captured wind power.

3. The wind powered energy amplification system of claim 2, further comprising;
drive panel systems modules configured to form wind capture modules to capture the power of the wind;
drive panel furling systems modules coupled to the drive panel systems and configured to rotate drive panels in various degrees of rotation; and
an automated furling control system coupled to the drive panel furling systems modules and configured to control degrees of rotation of the drive panel systems modules.

4. The wind powered energy amplification system of claim 1, further comprising tube frame support structure modules configured to support the cantilevered support structure modules.

5. The wind powered energy amplification system of claim 4, further comprising drive shaft systems modules coupled to the tube frame support structure modules and configured to transfer wind power rotation to modules that are not attached to the tube frame support structure modules.

6. The wind powered energy amplification system of claim 5 further comprising forced rotation modules coupled to the drive shaft systems and configured to allow transfer of a mechanically forced rotation.

7. The wind powered energy amplification system of claim 1, further comprising:
a bearing platform configured to allow rotation of the cantilevered support structure modules and coupled to the mounting apparatus, bearings and the cantilevered support structure modules;
a tube frame mounting bracket coupled to a mounting block and the tube frame support structure modules; and
a mounting block lock configured coupled to the tube frame mounting bracket and the mounting block and configured to prevent separation and lateral displacement.

8. The wind powered energy amplification system of claim 7, further comprising a convection cooled bearing system configured to create a low friction bearing with fluid lubricant cooling convection flow channels.

9. The wind powered energy amplification system of claim 8, further comprising;
a convex sliding rotating section configured to slide a convex surface on a fluid lubricant and to mate with an asymmetrical concave surface to form a convection flow channel;
an asymmetrical concave convection ring channel configured to mate with the convex sliding rotating section to form the convection flow channel, to connect to a mounting base and fluid cooling reservoir to form cooling channels;
a non uniform convection flow channel formed by the permanent separation of the mated opposing surfaces of the convex sliding rotating section and the asymmetrical concave convection ring channel and configured to create circulation of the fluid lubricant by convection; and
a stationary section mounting base and fluid cooling reservoir coupled to an object, the asymmetrical concave convection ring channel and configured to allow rotation, to form cooling channels, to act as a heat sink and to accumulate fluid lubricant in a fluid reservoir for supplying the convection flow channel.

10. The wind powered energy amplification system of claim 7, further comprising:
a flutter vane including a blade configured to rotate, wherein the flutter vane is coupled to the cantilevered support structure modules for harvesting energy of the air flow moving at speeds amplified by tangential speed;
a curved elongated panel including a Venturi wing coupled to a flutter vane axle hub and configured to allow rotation of blade;
a Venturi wing configured to form a Venturi constriction with an outer edge of the blade and configured to accelerate a speed of moving air by the Venturi effect to add force to the rotation of the flutter vane amplification energy harvest modules;
wherein the flutter vane axle hub is coupled to energy converting modules and the cantilevered support structure modules to position the flutter vane amplification energy harvest modules at a radial distance from the axis of rotation of the cantilevered support structure modules and configured to allow the flutter vane amplification energy harvest modules to rotate at tangential speeds; and
energy converting modules coupled to the flutter vane axle hub and configured to convert the energy harvested by the flutter vane transferred by connection to the flutter vane axle hub.

11. The wind powered energy amplification system of claim 7, further comprising:
a propeller coupled to a propeller shaft and rotation transfer modules and configured to allow the propeller to rotate for harvesting the energy of the air flow moving at speeds amplified by tangential speed and Venturi effect by rotating;
a propeller shaft and rotation transfer modules coupled to a nacelle to allow the propeller shaft and rotation transfer modules to connect to energy converting modules;
a nacelle coupled to an air scoop Venturi to provide a stable structure to hold the propeller in position;
an air scoop Venturi coupled to a housing to accelerate the speed of air encountered at tangentially amplified speeds;
a housing coupled to cantilevered support structure modules to position the propeller amplification energy harvest modules at a radial distance from the axis of rotation of the cantilevered support structure modules to allow the propeller amplification energy harvest modules to rotate at tangential speeds; and
energy converting modules coupled to the housing for converting the energy harvested by the propeller transferred by connection to the propeller shaft and rotation transfer modules.

12. The wind powered energy amplification system of claim 1, further comprising monitor and control modules configured to measure, control, record and transmit operating conditions and levels of the modules.

13. The wind powered energy amplification system of claim 1, further comprising extraction storage modules for storing and supplying extracted water and carbon dioxide.

14. The wind powered energy amplification system of claim 1, further comprising;
flutter vane amplification energy harvest modules configured to harvest and convert the energy of the air encountered at tangentially amplified speeds;
propeller amplification energy harvest modules configured to harvest and convert the energy of the air encountered at tangentially amplified speeds.

15. The extraction modules of claim 1, further comprising circular receiver assembly modules configured to form transitional connection devices to allow the collection systems used to convey the converted energy and extracted water to transition from a rotating state to a stationary state to convey the converted energy and extracted water to the converted energy process and storage modules.

* * * * *